(12) United States Patent
Tan et al.

(10) Patent No.: US 7,762,466 B2
(45) Date of Patent: Jul. 27, 2010

(54) TWO POSITION ZOOM LENS ASSEMBLY FOR AN IMAGING-BASED BAR CODE READER

(75) Inventors: Chinh Tan, Setauket, NY (US); Vladimir Gurevich, Stony Brook, NY (US); Rong Liu, Selden, NY (US); Tsi David Shi, Stony Brook, NY (US); Igor Vinogradov, New York, NY (US); Ming Yu, Hoffman Estates, IL (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 12/337,748

(22) Filed: Dec. 18, 2008

(65) Prior Publication Data

US 2010/0155485 A1   Jun. 24, 2010

(51) Int. Cl.
*G06K 7/10* (2006.01)
*G06K 7/00* (2006.01)

(52) U.S. Cl. .............. 235/462.42; 235/435; 235/462.01
(58) Field of Classification Search .............................. 235/462.01–462.49
See application file for complete search history.

(56) References Cited

U.S. PATENT DOCUMENTS

| | | | | |
|---|---|---|---|---|
| 5,473,149 A | * | 12/1995 | Miwa et al. | 235/462.41 |
| 6,340,114 B1 | * | 1/2002 | Correa et al. | 235/462.22 |
| 7,025,271 B2 | * | 4/2006 | Dvorkis et al. | 235/462.22 |
| 2007/0273798 A1 | * | 11/2007 | Silverstein et al. | 348/752 |
| 2008/0023548 A1 | * | 1/2008 | Tsi-Shi et al. | 235/462.22 |
| 2008/0142597 A1 | * | 6/2008 | Joseph et al. | 235/462.21 |
| 2008/0144186 A1 | * | 6/2008 | Feng et al. | 359/666 |

* cited by examiner

*Primary Examiner*—Michael G Lee
*Assistant Examiner*—Laura Gudorf

(57) ABSTRACT

An imaging-based bar code reader including: an imaging system for imaging a target bar code within a field of view of the imaging system and projecting light from the field of view onto a sensor array, the imaging system generating image frames of the field of view of the imaging system; the imaging systems including an imaging lens assembly having a plurality of lens and a selection drive mechanism to select between a first optical zoom position defining a first focal length and a first field of view for imaging a target bar code at a close range and a second optical zoom position defining a second focal length and a second field of view for imaging a target bar code at a far range, the second focal length being greater than the first focal length.

4 Claims, 12 Drawing Sheets

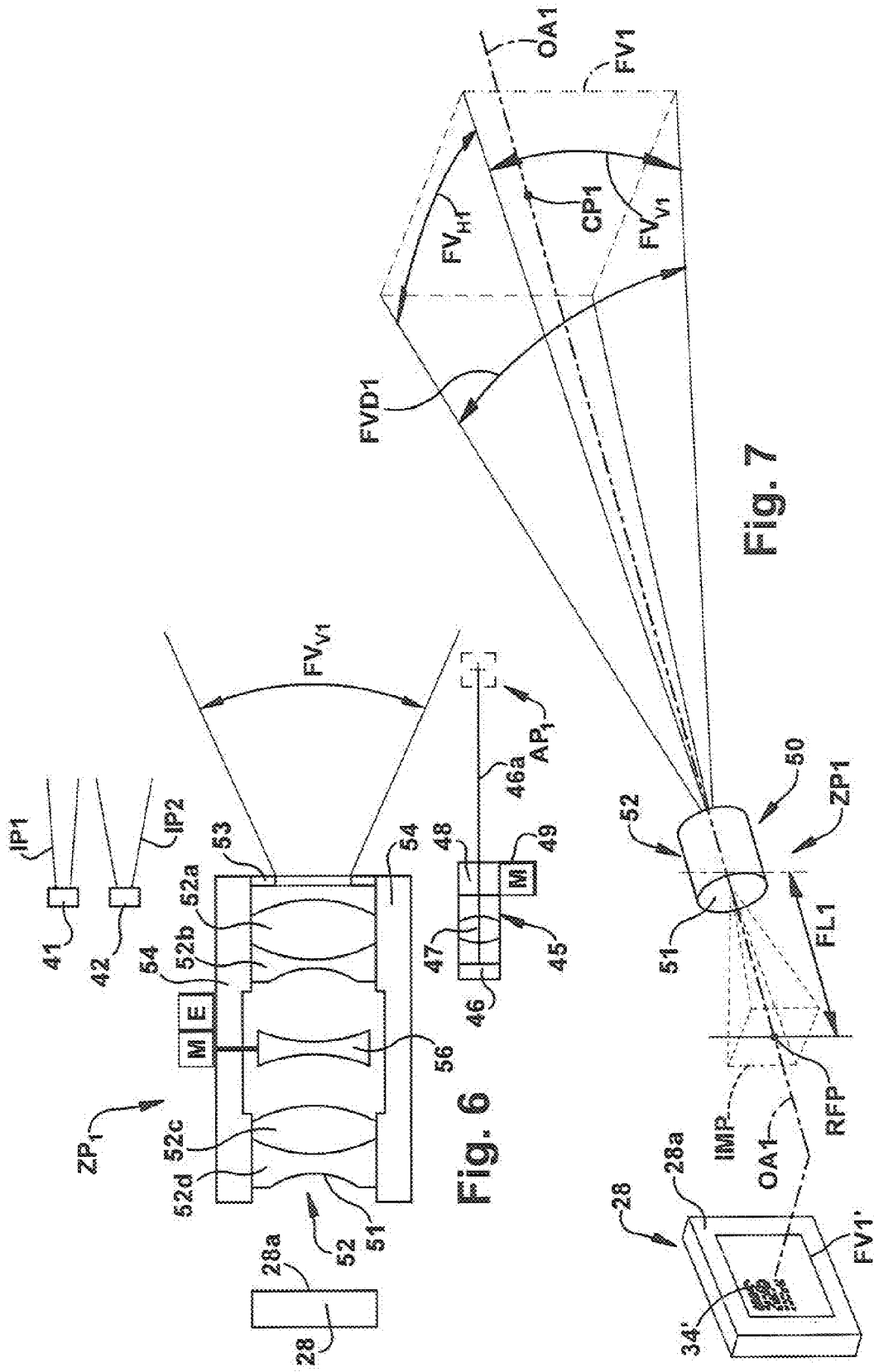

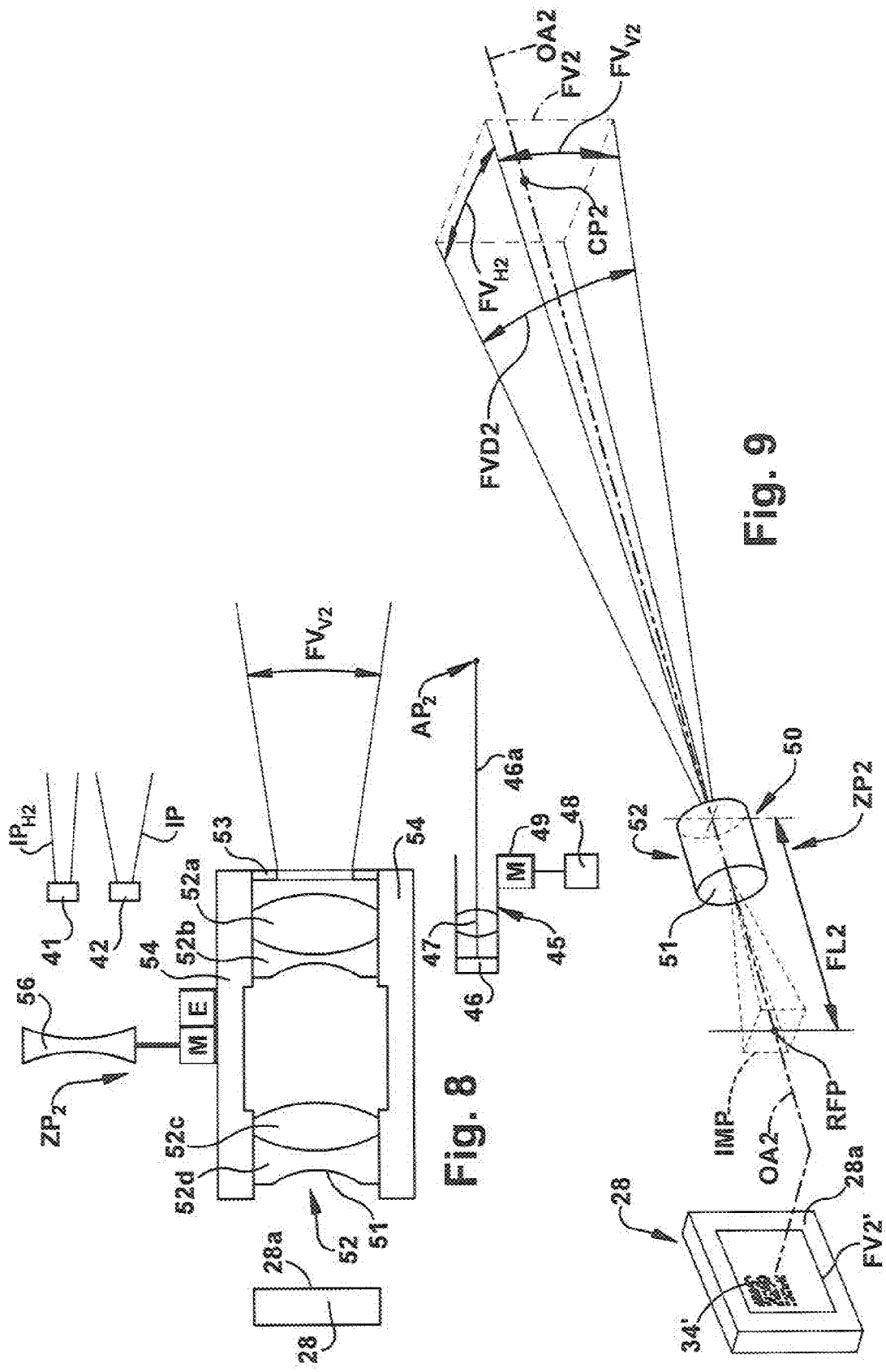

TWO POSITION ZOOM LENS ASSEMBLY FOR AN IMAGING-BASED BAR CODE READER

FIELD OF THE INVENTION

The present invention relates to an imaging-based bar code reader and, more particularly, to an imaging-based bar code reader having a two position optical zoom imaging lens assembly providing for a first optical zoom position having a first focal length for imaging a target bar code at a relatively short range from the imaging system and a second optical zoom position having a second focal length for imaging a target bar code at a relatively long range from the imaging system.

BACKGROUND

Various electro-optical systems have been developed for reading optical indicia, such as bar codes. A bar code is a coded pattern of graphical indicia comprised of a series of bars and spaces of varying widths, the bars and spaces having differing light reflecting characteristics. Some of the more popular bar code symbologies include: Universal Product Code (UPC), typically used in retail stores sales; Data Matrix, typically used for labeling small electronic products; Code 39, primarily used in inventory tracking; and Postnet, which is used for encoding zip codes for U.S. mail. Bar codes may be one dimensional (1D), i.e., a single row of graphical indicia such as a UPC bar code or two dimensional (2D), i.e., multiple rows of graphical indicia comprising a single bar code, such as Data Matrix which comprising multiple rows and columns of black and white square modules arranged in a square or rectangular pattern.

Systems that read bar codes (bar code readers) electro-optically transform the graphic indicia into electrical signals, which are decoded into alphanumerical characters that are intended to be descriptive of the article or some characteristic thereof. The characters are then typically represented in digital form and utilized as an input to a data processing system for various end-user applications such as point-of-sale processing, inventory control and the like.

Bar code readers that read and decode bar codes employing imaging systems are typically referred to as imaging-based bar code readers or bar code scanners. Imaging systems include charge coupled device (CCD) arrays, complementary metal oxide semiconductor (CMOS) arrays, or other imaging sensor arrays having a plurality of photosensitive elements (photosensors) defining image pixels. An illumination apparatus or system comprising light emitting diodes (LEDs) or other light source directs illumination toward a target object, e.g., a target bar code. Light reflected from the target bar code is focused through a system of one or more lens of the imaging system onto the sensor array. Thus, the target bar code within a field of view (FV) of the imaging lens system is focused on the sensor array.

Periodically, the pixels of the sensor array are sequentially read out generating an analog signal representative of a captured image frame. The analog signal is amplified by a gain factor and the amplified analog signal is digitized by an analog-to-digital converter. Decoding circuitry of the imaging system processes the digitized signals representative of the captured image frame and attempts to decode the imaged bar code.

As mentioned above, imaging-based bar code readers typically employ an imaging lens assembly for focusing scattered/reflected light from an object of interest within the field of view (FV) onto the sensor array. If a target object is within the field of view FV, an image of the target object will be focused onto the sensor array.

The working range (WR) of an imaging system is a distance range in front of or forward of the imaging lens assembly within which a target object of interest, such as a target bar code, may be successfully imaged and decoded by the imaging system decoding circuitry.

The working range (WR) and field of view (FV) require a user to move the bar code reader relative to the target bar code such that the target bar code is within the field of view (FV) and within the working range (WR) of the imaging system for successful decoding of the imaged target bar code. For example, if the target bar code is positioned at a distance that is greater than the working range, the size of the imaged target bar code will be too small and out of focus to be well resolved by the imaging system and therefore to be successfully decoded. That is, the pixels per module (PPM) will be below a threshold value and, therefore, too small to permit successful decoding. PPM is a measure of how many active pixels of a sensor array the smallest feature (bar or stripe) of a target bar code is imaged onto. Additionally, at the near and far limits of the working range (WR), there is a problem with blurriness, that is, poor resolution of the imaged target bar code.

For close range imaging applications, for example, where the target bar code is less than 20 inches from the reader, the imaging lens assembly will generally be configured such that the field of view FV will encompasses a largest expected target bar code at a closest working range distance. The field of view FV, for example, may subtend a horizontal angle of between 40-50 degrees. For long range imaging applications, for example, where the target bar code is more than 120 inches from the reader, the bar code density is lower, and a dimension of the bar code itself occupies a smaller portion of the field of view FV. Accordingly, the field of view FV, for example, may subtend a horizontal angle on the order of 12 degrees or less.

One potential solution to this problem would be to use a particular type of variable focus lens system used in photographic applications and called a zoom lens system. A zoom lens system permits changing of the focal length of the system. This could allow an effective working range (WR) of the imaging system to be increased by changing the focal length of the imaging lens assembly.

In a zoom lens system, typically there are two moving lenses, each of which move independently with respect to one or more stationary lenses. Advantageously, the independent movement of the two lenses allows the focal length (or magnification), as well as the field of view (FV) to be changed.

However, the problem with typical zoom lens systems is that the response time is typically too slow for data capture wherein a target bar code may be within the field of view FV only for a very short period of time.

Since imaging-based bar code readers are typically housed in small housings decreasing the size and complexity of the imaging lens system is desirable. Further, as most photographic optical zoom systems require multiple drive motors, this increases the required footprint of the imaging lens system and increase the cost of the imaging lens system. Often, the required movement of the lens or lenses is long and requires substantial time. Additionally, lens movements provide wear and tear on the drive motor or motors involved.

What is needed is an imaging lens system for an imaging-based bar code reader that can be used for both short and long range imaging. What is also needed is an imaging lens system that has the advantages of a zoom lens system, namely, a variable focal length and field of view (FV), while being less complex and requiring fewer drive motors than typical photographic zoom lens systems.

SUMMARY

In one aspect, the present invention features an imaging-based bar code reader including: an imaging system for imaging a target bar code within a field of view of the imaging system and projecting light from the field of view onto a sensor array, the imaging system generating image frames of the field of view of the imaging system; the imaging systems including an imaging lens assembly having a plurality of lens and a selection drive mechanism to select between a first optical zoom position defining a first focal length and a first field of view for imaging a target bar code at a close range and a second optical zoom position defining a second focal length and a second field of view for imaging a target bar code at a far range, the second focal length being greater than the first focal length and a diagonal angle subtended by the first field of view being greater than a diagonal angle subtended by the second field of view; an illumination assembly including an illumination source providing an illumination pattern projected toward a target bar code, the illumination assembly selectively actuatable between a first illumination pattern and a second illumination pattern, the first illumination pattern being generated when imaging using the first optical zoom position to illuminate the first field of view and the second illumination pattern being generated when imaging using the second optical zoom position to illuminate the second field of view; and an aiming pattern assembly including an illumination source providing an aiming pattern projected toward a target bar code, the aiming pattern assembly selectively actuatable between a first aiming pattern and a second aiming pattern, the first aiming pattern being generated when imaging using the first optical zoom position to facilitate aiming the reader at a center of the first field of view and the second aiming pattern being generated when imaging using the second optical zoom position to facilitate aiming the reader at a center of the second field of view.

In one exemplary embodiment, a zoom ratio between the first optical zoom position and the second optical zoom position is at least 2:1. In one exemplary embodiment, the zoom ration may be on the order of 4:1.

In one exemplary embodiment, the plurality of lens of the imaging lens assembly defines an optical axis and the selection drive mechanism includes a negative power lens selectively movable between a first position in alignment with the optical axis and a second position laterally offset from the optical axis and the plurality of lenses, in the first optical zoom position, the negative power lens being in the first position in alignment with the optical axis and, in the second optical zoom position, the negative power lens being in the second position laterally offset from the optical axis and the plurality of lenses.

In one exemplary embodiment, the imaging lens assembly comprises a first set of lenses having a first optical axis and defining the first focal length and the first field of view, the first optical axis aligned with the sensor array, and a second set of lenses having a second optical axis laterally offset from the first optical axis and the sensor array and defining the second focal length and the second field of view, the selection drive mechanism including a first fold minor movable between a first position wherein light focused through the first set of lenses is projected onto the sensor array while light focused through the second set of lenses is not projected onto the sensor array and a second position in alignment with the first optical axis wherein light focused through the second set of lenses is projected onto the sensor array while light focused through the first set of lenses is reflected by a first surface of the first fold mirror and is not projected onto the sensor array, the first position of the fold minor defining the first optical zoom position and the second position of the fold mirror defining the second optical zoom position.

In one exemplary embodiment, the selection drive mechanism further includes a second fold minor is positioned to reflect light focused by the second set of lenses onto the first fold mirror when the first fold mirror is in the second position, light focused by the second set of lenses being reflected from the second fold mirror to a second surface of the first fold minor and projected onto the sensor array.

In one exemplary embodiment, the imaging lens assembly comprises a first set of lenses having a first optical axis and defining the first focal length and the first field of view, the first optical axis aligned with the sensor array, and a second set of lenses having a second optical axis laterally offset from the first optical axis and the sensor array and defining the second focal length and the second field of view, the selection drive mechanism including a first light blocker selectively actuatable between a first transparent state wherein light focused through the first set of lenses is projected onto the sensor array and a second blocking state wherein light focused through the first set of lenses is blocked from projection onto the sensor array and a second light blocker selectively actuatable between a first transparent state wherein light focused through the second set of lenses is projected onto the sensor array and a second blocking state wherein light focused through the second set of lenses is blocked from projection onto the sensor array and a prism positioned between the first set of lenses, the second set of lenses and the sensor array to project light focused by either of the first set of lenses or the second set of lenses onto the sensor array at a normal angle, the first blocker being in the first transparent state and the second blocker being in the second blocking state defining the first optical zoom position and the first blocker being in the second blocking state and the second blocker being in the first transparent state defining the second optical zoom position.

In one exemplary embodiment, the first blocker is a light blocking cover that is selectively movable between a first position that is laterally offset from the first optical axis and the first set of lenses, the first position corresponding to the first transparent state for the first blocker and a second position that is in alignment with the first optical axis and the first set of lenses, the second position corresponding to the second blocking state of the first blocker and the second blocker is a light blocking cover that is selectively movable between a first position that is laterally offset from the second optical axis and the second set of lenses, the first position corresponding to the first transparent state of the second blocker and a second position that is in alignment with the second optical axis and the second set of lenses, the second position corresponding to the second blocking state of the second blocker.

In one exemplary embodiment, the first blocker is a cholesteric liquid crystal element that is selectively switchable between a transparent state and a reflective state, the transparent state corresponding to the first transparent state for the first blocker and the reflective state corresponding to the second blocking state of the first blocker and the second blocker is a cholesteric liquid crystal element selectively switchable between a transparent state and a reflective state, the transparent state corresponding to the first transparent state of the second blocker and the second reflective state corresponding to the second blocking state of the second blocker.

In one exemplary embodiment, the imaging lens assembly comprises a first set of lenses having a first optical axis and defining the first focal length and the first field of view, the first optical axis aligned with the sensor array, and a second set of lenses having a second optical axis offset from the first optical axis and defining the second focal length and the second field of view, the second optical axis substantially parallel to the first optical axis and offset from the first optical axis and the sensor array, the selection mechanism including a first cholesteric liquid crystal element aligned with the first optical axis and a second cholesteric liquid crystal element aligned with the second optical axis, each of the first and second liquid crystal elements selectively switchable between a transparent state and a reflective state, the first liquid crystal element disposed transversely to the first optical axis and the second liquid crystal element disposed transversely to the second optical axis such that when both liquid crystal elements are in a transparent state, light focused through the first set of lenses is projected onto the sensor array while light focused through the second set of lenses is not projected onto the sensor array and when both liquid crystal elements are in a reflective state, light focused through the second set of lenses is reflected from the first second liquid crystal element to the first liquid crystal element and projected onto the sensor array while and position wherein light focused through the second set of lenses is projected onto the sensor array while light focused through the first set of lenses is not projected onto the sensor array, the first optical zoom position defined by the first and second liquid crystal elements being in the transparent state and the second optical zoom position defined by the first and second liquid crystal elements being in the reflective state.

In one exemplary embodiment, the plurality of lenses of the imaging lens assembly defines an optical axis aligned with the sensor array and the selection drive mechanism comprises an external iris selectively actuatable to move between a first aperture size and a second aperture size and a liquid lens assembly selectively actuatable to change optical configuration between a first optical power and a second optical power, the first aperture size of the external iris and the first optical power of the liquid lens assembly defining the first optical zoom position and the second aperture size of the external iris and the second optical power of the liquid lens assembly defining the second optical zoom position.

In one exemplary embodiment, the liquid lens assembly comprises a plurality of liquid lenses and the external iris comprises a liquid crystal element defining a clear aperture portion, a size of the clear aperture portion being variable between the first and second aperture sizes via a voltage applied by the selection drive mechanism.

In one exemplary embodiment, the illumination assembly light source includes a first bank of LEDs providing wide angle illumination to generate the first illumination pattern and a second bank of LEDs providing narrow angle illumination to generate the second illumination pattern, the selection drive mechanism operatively coupled to the illumination assembly and selectively actuating the first illumination pattern when the first optical zoom position is selected and selectively actuating the second illumination assembly when the second optical zoom position is selected.

In one exemplary embodiment, the illumination assembly light source includes a bank of LEDs and a pair of diffusers including a first diffuser positioned adjacent the bank of LEDs to focus light emitted by the band of LEDs into the first illumination pattern and a second diffuser positioned adjacent the bank of LEDs to focus light emitted by the band of LEDs into the second illumination pattern, the selection drive mechanism operatively coupled to the illumination assembly and selectively actuating the first illumination pattern when the first optical zoom position is selected and selectively actuating the second illumination assembly when the second optical zoom position is selected.

In one exemplary embodiment, the illumination assembly light source includes a bank of LEDs and a voltage-controlled spatial light modulator position adjacent the bank of LEDs and selectively actuatable between a first spatial frequency to focus light emitted by the band of LEDs into the first illumination pattern and a second spatial frequency to focus light emitted by the band of LEDs into the second illumination pattern, the selection drive mechanism operatively coupled to the illumination assembly and selectively actuating the first illumination pattern when the first optical zoom position is selected and selectively actuating the second illumination assembly when the second optical zoom position is selected.

These and other objects, advantages, and features of the exemplary embodiments are described in detail in conjunction with the accompanying drawings.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, in which:

FIG. 6 is a schematic side elevation view of a first exemplary embodiment of a two position optical zoom imaging lens assembly of the present invention in a first zoom position for imaging a target bar code at a near distance from the imaging lens assembly;

FIG. 7 is a schematic perspective position of the a field of view and projected image plane of the imaging lens assembly of FIG. 6 in the first zoom position;

FIG. 8 is a schematic side elevation view of a first exemplary embodiment of the two position optical zoom imaging lens assembly of FIG. 6 in a second zoom position for imaging a target bar code at a far distance from the imaging lens assembly;

FIG. 9 is a schematic perspective position of the a field of view of the imaging lens assembly of FIG. 6 in the second zoom position;

DETAILED DESCRIPTION

Figure 1:
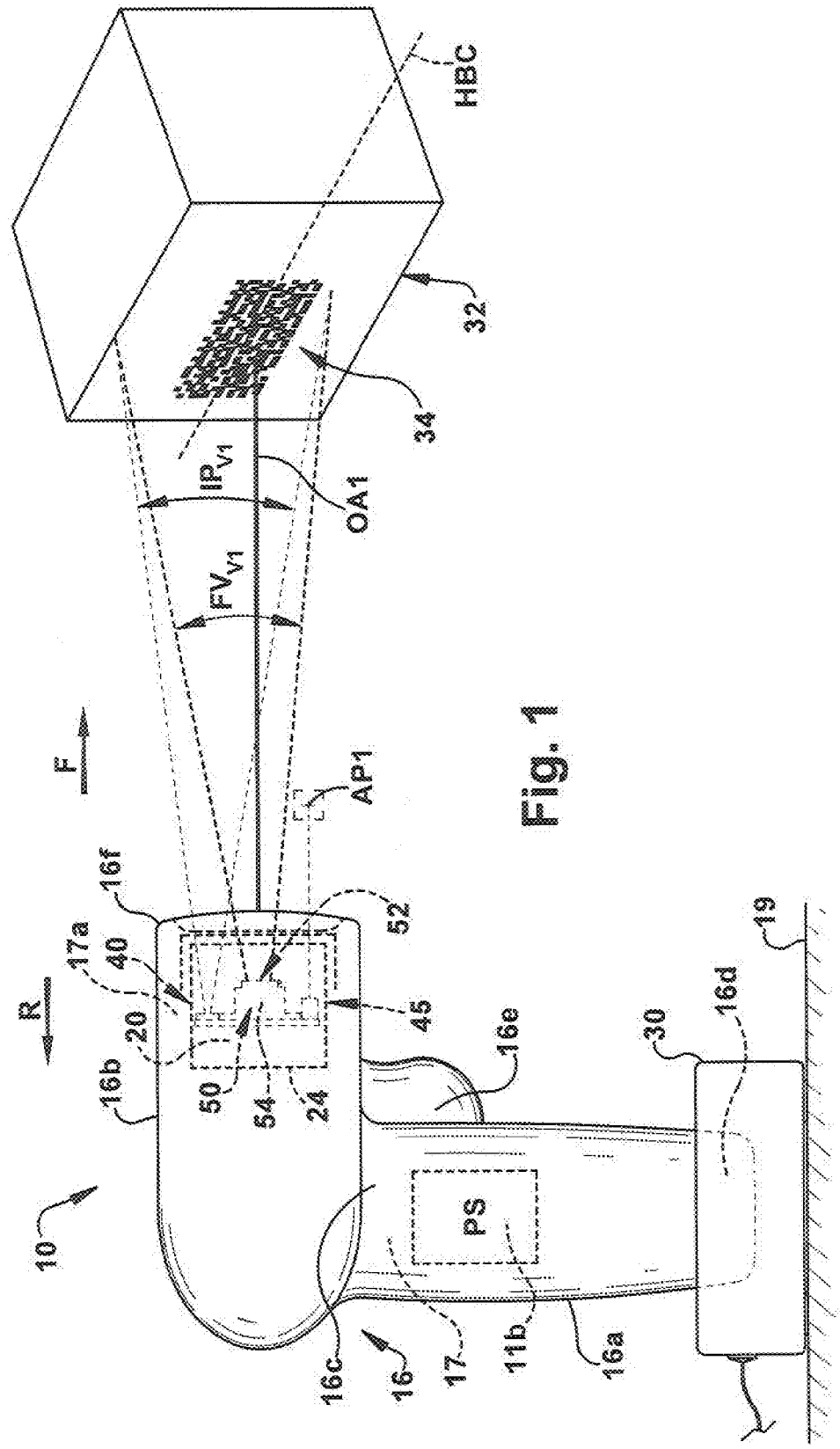
FIG. 1 is a schematic side elevation view of an exemplary embodiment of an imaging-based bar code reader of the present invention.
Figure 2:
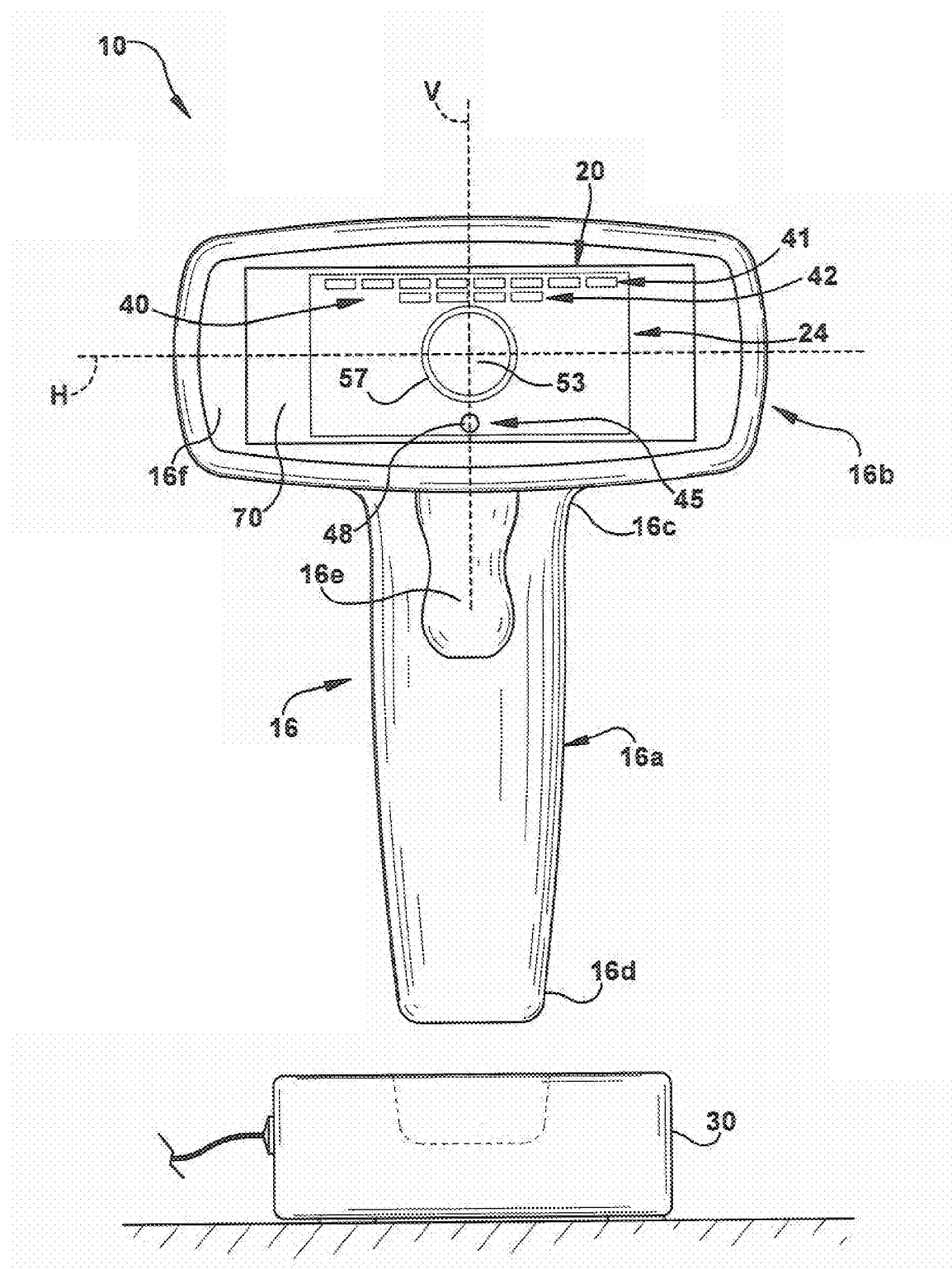
FIG. 2 is a schematic front elevation view of the bar code reader of FIG. 1.

A first exemplary embodiment of an imaging-based bar code reader of the present invention is shown schematically at 10 in FIGS. 1-9. The bar code reader 10 includes an imaging system 12 and a decoding system 14 mounted in a housing 16. The reader 10 is capable of reading, that is, imaging and decoding encoded indicia printed on or affixed to target objects 32. Typically the encoded indicia will be in the form of a target 1D or 2D bar code. A typical 2D bar code is shown at 34 in FIGS. 1 and 5. As used herein, a target bar code will be understood to encompass both 1D and 2D bar codes.

The imaging system 12 is adapted to capture image frames of a field of view of the imaging system 12 and the decoding system 14 is adapted to decode encoded indicia within a captured image frame. The housing 16 supports circuitry 11 of the reader 10 including the imaging and decoding systems 12, 14 within an interior region 17 of the housing 16.

The imaging system 12 comprises a modular scan engine or imaging camera assembly 20 and associated imaging circuitry 22 supported within a camera housing 24. The camera assembly 20 includes a sensor array 28 and an imaging lens assembly 50. The imaging lens assembly 50 focusing or projecting light from a field of view extending in a direction forward F (FIG. 1) of the imaging lens assembly onto a light receiving portion 28a of the sensor array 28. The sensor array 28 comprises an array of photosensors or pixels and is positioned rearward or in a direction rearward R (FIG. 1) of the imaging lens assembly 50. The camera housing 24 additionally supports an illumination assembly 40 for projecting illumination toward the field of view and an aiming pattern assembly 45 for projecting an aiming pattern to aid a user of the reader 10 in properly aiming the reader at a target bar code 34.

Advantageously, in the present invention, the imaging lens assembly 50 is configured to be selectively moved between two states or optical zoom positions ZP1, ZP2 (shown schematically in FIGS. 6 and 8, respectively for one embodiment of the imaging lens assembly). The optical zoom positions ZP1, ZP2 having differing optical properties and define two distinct fields of view FV1, FV2 (shown schematically in FIGS. 7 and 9, respectively) for imaging purposes. The first field of view FV1 is especially suited for imaging a target bar code 34 at a relatively short distance from the reader 10 (e.g., a distance of an arms' length or less—approximately 20 inches or less) and the second field of view FV2 is especially suited for imaging target bar codes at a relatively long distance from the reader 10 (e.g., more than 20 inches and typically on the order of 5-10 feet or more).

Advantageously, in conformity of with the imaging system 12 having two distinct, selectable zoom positions ZP1, ZP2 corresponding to two distinct fields of view FV1, FV2, the illumination assembly 40 is configured to have two states, that is, to generate two distinct, selectable illumination patterns IP1, IP2. The first illumination pattern IP1 is especially suited to short range imaging, while the second illumination pattern IP2 is especially suited to long range imaging. Similarly, the aiming pattern assembly 45 is configured to have two states, that is, generate two distinct, selectable aiming patterns, AP1, AP2. The first aiming pattern AP1 is especially suited to accurately aiming the reader 10 when performing short range imaging, while the second aiming pattern AP1 is especially suited to accurately aiming the reader when performing long range imaging.

Figure 3:
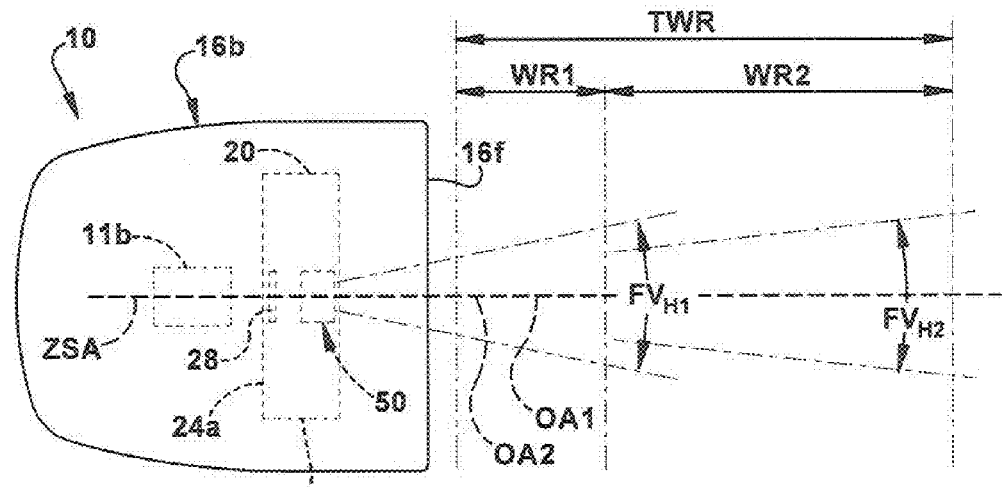
FIG. 3 is a schematic top plan view of the bar code reader of FIG. 1.

The camera assembly 20 may be modular in that the camera housing 24 is be removed or inserted as a unit into the reader housing 16, allowing the ready substitution of camera assemblies having different imaging characteristics, e.g., camera assemblies having different focal distances, working ranges, and fields of view. A working range is a distance range in front of or forward (in a direction F in FIG. 1) of the camera assembly 20 within which a target object of interest 32, such as a target bar code 34, may be successfully imaged and decoded. Because the imaging system 12 is selectable between short and long range imaging, there are two working ranges, as schematically shown in FIG. 3, associated with the first zoom position ZP1 is a first working range WR1 for short range imaging and, associated with the second zoom position ZP2 is a second, overlapping working range WR2 for long range imaging. Thus, the selectable optical zoom provides for an extended total working range TWR of the imaging system 12.

Optically, the field of view FV is a ratio of the size of the light receiving portion 28a of the sensor 28 divided by a focal length of the imaging lens assembly 50. A focal length or, more correctly stated, an effective focal length of the imaging lens assembly 50, depends on the zoom position ZP1, ZP2 of the assembly. Focal lengths FL1, FL2 for the imaging lens assembly 50 for zoom positions ZP1, ZP2 are shown schematically in FIGS. 7 and 9. As can be seen, the focal length FL2 associated with the second zoom position ZP2 is greater than the focal length FL1 associated with the first zoom position ZP1. Conceptually, a focal length can be thought of as extending forward from a rear focal point RFP or image plane IMP of the imaging lens assembly 50 to a theoretical point where the rays of light intersect to form a focal point. For both zoom positions ZP1 ZP2, the rear focal point RFP and the image plane IMP are substantially coincident with the light receiving surface 28a of the sensor array 28 such that a suitably in-focus image 34' of a target bar code 34 would be focused by the imaging lens assembly 50 onto the sensor array light receiving surface 28a.

For example, if, in one exemplary embodiment, the angular diagonal fields of view FVD1, FVD2 (as shown in FIGS. 7 and 9 respectively for the first and second fields of view FV1, FV2) are approximately 60° (1.05 radians) and 15° (0.26 radians), respectively. The diagonal measurement of the light receiving region 28a of the sensor array 28 is approximately 0.25 inch or 6.35 mm, then the respective focal lengths FL1 and FL2 would be: FL1=6.35 mm/1.05 radians=6 mm, while FL2=6.35 mm/0.26 radians=24.3 mm.

Optical power OP in diopters is the reciprocal of the focal length (1/FL) where focal length is expressed in meters. Accordingly, for the exemplary embodiment discussed above, the corresponding optical powers OP1, OP2 for the first and second optical zoom positions ZP1, ZP2 would be OP1=1/0.006 m=167 diopters, while OP2=1/0.0243 m=41 diopters. In another exemplary embodiment, the optical powers for optical zoom positions ZP1, ZP2 may be approximately, OP1=200 diopters and OP2=50 diopters. The zoom ratio between the optical powers OP1/OP2 of the first zoom position ZP1 to the second zoom position ZP2 is at least 2:1 or 2× and, preferably, is on the order of 4:1 or greater. For example, if the optical power of the imaging lens assembly 50 in the first optical zoom position ZP1 is OP1=400 diopters and the optical power OP2 in the second optical zoom position ZP2 is 50 diopters, then the zoom ratio is 200/50=4×. This corresponds to the ratio of the diagonal angular fields of view FVD1, FVD2 of 4:1, namely 60°:15°.

The first optical zoom position ZP1 corresponds to the imaging lens assembly 50 having optical characteristics of a relatively short focal length FL1 (e.g., 5 mm.) and a corresponding wide field of view FV1 (e.g., 60°) which is suitable or adapted to image a target bar code 34 at a relatively short range from the imaging system 12. The second optical zoom position ZP2 corresponds to the imaging lens assembly 50 having an optical characteristics of a relatively long focal length FL2 (e.g., 20 mm.) and a corresponding narrow field of view (e.g., 15°) which is suitable to image a target bar code 34 at a long range from the imaging system 12. As defined herein, short range imaging is imaging of a typical 1D bar code, such as a UPC bar code, at a range of arms' length (approximately 20 inches or less), while long range imaging is more than arms' length, that is, more than 20 inches and typically on the order of 5-10 feet or more.

In one exemplary embodiment, the imaging system 12 is a two dimensional (2D) imaging system and the sensor array 28 is a 2D sensor array. It should be understood, however, that the present invention is equally applicable to a linear or one dimensional imaging system having a 1D linear sensor array. The sensor array 28 is primarily adapted to image 1D and 2D bar codes, for example, a Data Matrix bar code as schematically shown in FIG. 1 which extends along a horizontal axis HBC and includes multiple rows of indicia comprising a multi-row, multi-column array of dark bars and white spaces. However, one of skill in the art would recognize that the present invention is also applicable to image postal codes, signatures, etc.

The sensor array 28 is enabled during an exposure period to capture an image of a target object 32, such as a target bar code 34, within the selected field of view FV1, FV2 of the imaging system 12. The fields of view FV1, FV2 of the imaging system 12 are a function of both the configuration of the sensor array 28 and the lens assembly 50 and the distance and orientation between the array 28 and the lens assembly 50.

As can best be seen in FIGS. 7 and 9, the fields of view FV1, FV2 are generally rectangular. In the respective fields of view FV1, FV2 are characterized by a horizontal extent FVH1, FVH2, respectively, a vertical extent FVV1, FVV2, respectively, and a angular field of view measured diagonally across the field of view denoted as FVD1, FVD2, respectively. As noted above, in one exemplary embodiment, by way of example, FVD1=60° and FVD2=15°.

Housing 16

The housing 16 includes a gripping portion 16a adapted to be grasped by an operator's hand and a forward or scanning head portion 16b extending from an upper part 16c of the gripping portion 16a. A lower part 16d of the gripping portion 16a is adapted to be received in a docking station 30 positioned on a substrate 19 such as a table or sales counter. The scanning head 16b supports the imaging system 12 within an interior region 17a (FIG. 4) of the scanning head 16b. As can best be seen in FIG. 2, looking from the front of the housing 16, the scanning head 16b is generally rectangular in shape and defines a horizontal axis H and a vertical axis V. The vertical axis V being aligned with a general extent of the gripping portion 16a.

Advantageously, the reader 10 of the present invention is adapted to be used in both a hand-held mode and a fixed position mode. In the fixed position mode, the housing 16 is received in the docking station 30 and the target bar code 34 of the target object 32 (FIG. 1) is brought within one of the fields of view FV1, FV2 of the reader's imaging system 12 in order to have the reader 10 read the target bar code 34. The imaging system 12 is typically always on or operational in the fixed position mode to image and decode any target bar code presented to the reader 10 within the field of view FV. The docking station 30 is plugged into an AC power source and provides regulated DC power to circuitry 11 of the reader 10. Thus, when the reader 10 is in the docking station 30 power is available to keep the imaging system 12 on continuously.

In the hand-held mode, the housing 14 is removed from the docking station 30 so the reader 10 can be carried by an operator and positioned such that the target bar code 34 is within one of the fields of view FV1, FV2 of the imaging system 12. In the hand-held mode, imaging and decoding of the target bar code 34 is instituted by the operator depressing a trigger 16e extending through an opening near the upper part 16c of the gripping portion 16a.

Imaging System 12

Figure 5:
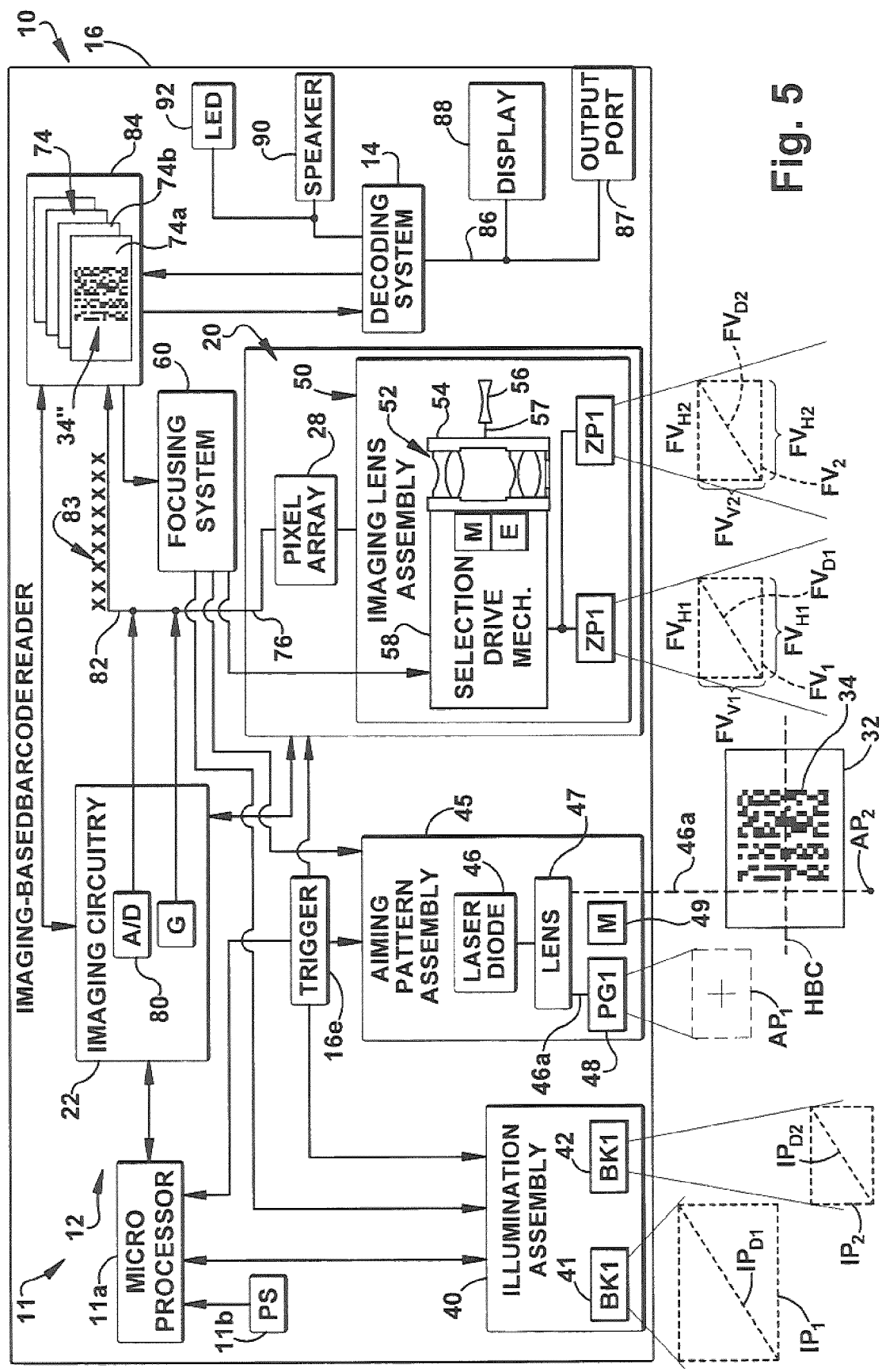
FIG. 5 is a schematic block diagram of the bar code reader of FIG. 1.

The imaging system 12 is part of the bar code reader circuitry 11 which operates under the control of a microprocessor 11a (FIG. 5). When removed from the docking station 30, power is supplied to the imaging and decoding systems 12, 14 by a power supply 11b. The imaging and decoding systems 12, 14 of the present invention may be embodied in hardware, software, electrical circuitry, firmware embedded within the microprocessor 11a or the modular camera assembly 20, on flash read only memory (ROM), on an application specific integrated circuit (ASIC), or any combination thereof as would be understood by one of skill in the art.

The imaging circuitry 22 may be disposed within, partially within, or external to the camera assembly housing 24. A back end of the housing 24 may be comprised of a printed circuit board 24a, which forms part of the imaging circuitry 22 and extends vertically to also support the illumination source 42 (best seen in FIG. 4).

The camera housing 24 is supported within the scanning head interior region 17a in proximity to a transparent window 70 (FIG. 4) defining a portion of a front wall 16f of the scanning head 16b. The window 70 is oriented such that its horizontal axis is substantially parallel to the scanning head horizontal axis H. The vertical axis of the window 70 is tilted slightly to avoid specula reflection. Specula reflection would occurs if, for example, a virtual image of one or more LEDs of the illumination assembly 40 were to be projected by the exit window 70 within the fields of view FV1, FV2 of the imaging system 12.

Sensor Array 28

The imaging system 12 includes the sensor array 28 of the imaging camera assembly 20. The sensor array 28 comprises a charged coupled device (CCD), a complementary metal oxide semiconductor (CMOS), or other imaging pixel array, operating under the control of the imaging circuitry 22. In one exemplary embodiment, the sensor array 28 comprises a two dimensional (2D) mega pixel CMOS array with a typical size of the pixel array being on the order of 1280×1024 pixels. Each pixel is comprised of a photosensitive element or photosensor that receives light and stores a charge proportional to the intensity of the light received and then is periodically discharged to generate an electrical signal whose magnitude is representative of the charge on the photosensitive element during an exposure period.

Figure 4:
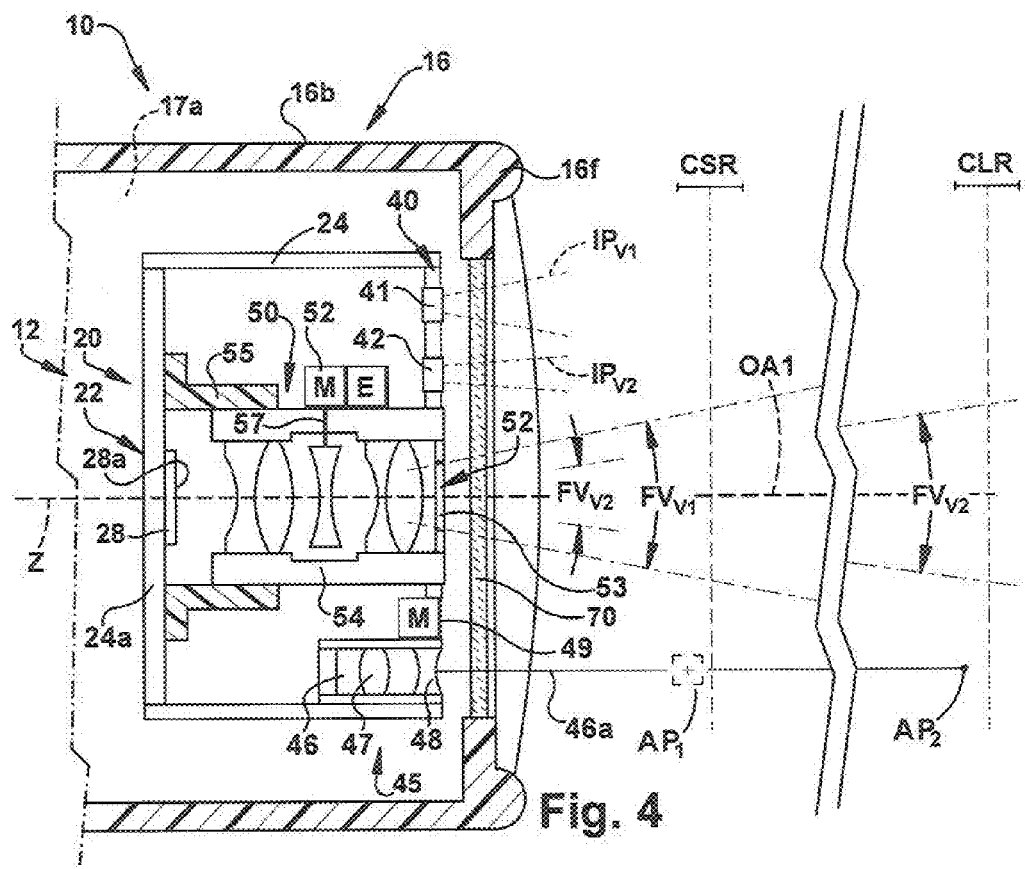
FIG. 4 is a schematic view partly in section and partly in side elevation of a camera assembly of an imaging assembly of the bar code reader of FIG. 1 including a first exemplary embodiment of a two position optical zoom imaging lens assembly of the present invention selectively actuatable between a first optical zoom position for imaging a target bar code at a near distance from the imaging lens assembly and a second optical zoom position for imaging a target bar code at a far distance from the imaging lens assembly, a first exemplary embodiment of an aiming pattern assembly selectively actuatable for projecting a first aiming pattern for aiming the reader at a target bar code at a near distance from the imaging lens assembly and a second aiming pattern for aiming the reader at a target bar code at a far distance from the imaging lens assembly, and a first exemplary embodiment of an illumination pattern assembly for projecting a first illumination pattern substantially corresponding to a first field of view of the imaging lens assembly when the imaging lens assembly is in a first zoom position and a second illumination pattern substantially corresponding to a second field of view of the imaging lens assembly when the imaging lens assembly is in a second zoom position.

The illumination-receiving pixels of the sensor array 28 define a light receiving sensor array surface 28a (best seen in FIG. 4). The sensor array 28 is secured to the printed circuit board 24a, in parallel direction for stability. The sensor array surface 28a is substantially perpendicular to the optical axis OA1, OA2 of the imaging lens assembly 5, that is, a z axis (labeled Z in FIG. 4) that is perpendicular to the sensor array surface 28a would be substantially parallel to the optical axis OA1, OA2 of the lens assembly 50. The pixels of the sensor array surface 28a are disposed substantially parallel to the horizontal axis H of the scanning head 16b.

As can be seen in FIG. 4, the imaging lens assembly 50 focuses light reflected and scattered from the target bar code 34 onto the sensor array surface 28a of the sensor array 28. Thus, the lens assembly 50 focuses an image 34' (shown schematically in FIG. 7) of the target bar code 34 (assuming it is within the field of view FV) onto the array of pixels comprising the light receiving surface 28a of the sensor array 28. The field of view focused onto the sensor array surface 28a is shown schematically as FV1' in FIG. 7.

Operation of Imaging and Decoding Systems 12, 14

When actuated to read the target bar code 34, the imaging system 12 captures a series of image frames 74 (FIG. 5) which are stored in a memory 84. Each image frame of the series of image frames 74, e.g., image frame 74a, includes a digital representation (shown schematically as 34" in FIG. 5) of the image 34' of the target bar code 34. The decoding system 14 decodes the digitized representation 34" of the imaged bar code 34'.

Electrical signals are generated by reading out of some or all of the pixels of the sensor array 28 after an exposure period. After the exposure time has elapsed, some or all of the pixels of sensor array 28 are successively read out thereby generating an analog signal 76 (FIG. 5). In some sensors, particularly CMOS sensors, all pixels of the sensor array 28 are not exposed at the same time, thus, reading out of some pixels may coincide in time with an exposure period for some other pixels.

The analog image signal 76 represents a sequence of photosensor voltage values, the magnitude of each value representing an intensity of the reflected light received by a photosensor/pixel during an exposure period. The analog signal 76 is amplified by a gain factor, generating an amplified analog signal 78. The imaging circuitry 22 further includes an analog-to-digital (A/D) converter 80. The amplified analog signal 78 is digitized by the A/D converter 80 generating a digitized signal 82. The digitized signal 82 comprises a sequence of digital gray scale values 83 typically ranging from 0-255 (for an eight bit processor, i.e., $2^8=256$), where a 0 gray scale value would represent an absence of any reflected light received by a pixel during an exposure or integration period (characterized as low pixel brightness) and a 255 gray scale value would represent a very high intensity of reflected light received by a pixel during an exposure period (characterized as high pixel brightness).

The digitized gray scale values 83 of the digitized signal 82 are stored in the memory 84. The digital values 83 corresponding to a read out of the sensor array 28 constitute an image frame 74, which is representative of the image projected by the imaging lens assembly 50 onto the sensor array 28 during an exposure period. If the field of view FV1, FV1 corresponding to the selected zoom position ZP1 or ZP2 of the imaging lens assembly 50 includes the target bar code 34, then a digital gray scale value image 34" of the target bar code 34 would be present in the image frames 74.

The decoding circuitry 14 then operates on the digitized gray scale values 83 of the image frame 74 and attempts to decode any decodable image within the image frame, e.g., the imaged target bar code 34". If the decoding is successful, decoded data 86, representative of the data/information encoded in the target bar code 34 is then output via a data output port 87 and/or some or all of the decoded data 86 is displayed to the operator of the reader 10 via a display 88. Upon achieving a good "read" of the bar code 34, that is, the target bar code 34 was successfully imaged and decoded, a speaker 90 and/or an indicator LED 92 is activated by the bar code reader circuitry 13 to indicate to the user that the target bar code 34 has successfully read, that is, the target bar code 34 has been successfully imaged and the digitized imaged bar code 34" has been successfully decoded. If decoding is unsuccessful, another image frame, e.g., image frame 74b, 74c, etc., is selected and the decoding process is repeated until a successful decode is achieved.

First Exemplary Embodiment of Imaging Lens Assembly 50

The first exemplary embodiment of the imaging lens assembly 50 is best seen in FIGS. 4, 6 and 8. The lens assembly includes a plurality of fixed lenses 52, namely lines 52a, 52b, 52c, 52d and an aperture stop 53 supported in a lens holder 54. The lens holder 54 is supported by a shroud 55 affixed to the camera assembly PC board 24a.

The first and second optical zoom positions ZP1, ZP2 are defined by the position of a movable lens 56. The movable lens 56 is a concave optic surface lens having a negative optical power. The movable lens 56 is supported on a holder 57 which is coupled to a drive motor M. The drive motor M may be, for example, a relatively inexpensive synchronous DC motor. The drive motor M selectively drives the holder 57 and thus the movable lens 56 laterally into and out of alignment with the optical axis defined by plurality of fixed lenses 52, namely, optical axis OA2. In the first optical zoom position ZP1 (FIGS. 4 and 6), the movable lens 56 is in alignment with the plurality of lenses 52 and in the second optical zoom position ZP2 (FIG. 8), the movable lens 56 is removed from alignment with the plurality of lenses 52. Stated another way, the optical axis OA1 defined by the plurality of fixed lenses 52 and the movable lens 56 aligned therewith (zoom position ZP1) is congruent with the optical axis OA2 defined by the plurality of fixed lenses 54 (zoom position ZP2).

As would be understood by one of skill in the art, the selection of the individual lenses 52, 56 will be dependent upon the desired overall optical characteristics of the two zoom positions ZP1, ZP2. For example, the selection of lenses may be varied so long as, in one exemplary embodiment, the angular diagonal fields of view FVD1, FVD2 are, for example, FVD1=60° and FVD1=15°, respectively and the respective focal lengths are FL1=5 mm. and FL2=20 mm. For long range imaging, a smaller field of view, such as a diagonal angular field of view of 15° or less, is desirable. This is because as the distance between the reader and a target bar code 34 increases, a portion of a field of view occupied by the target bar code 34 decreases. Thus, for long range imaging it is desirable to have a smaller field of view such that the target bar code 34 occupies a relatively larger portion of the field of view. For short range imaging, it is desired to set the diagonal angular field of view at an angle that is sufficient generated a field of view that is sufficiently largest to envelope the largest sized target bar code 34 when presented at the minimum working range of the reader. Typically, a diagonal angular field of view of between 40-60° is utilized for short range imaging.

The movement of the movable lens 56 between the first and second zoom positions ZP1, ZP2 is effected by the motor M. An encoder E generates signals indicative of the position of the movable lens 56 along its path of travel. The motor M and encoder E are components of a selection drive mechanism 58 of the camera assembly 20 which functions to reconfigure the imaging lens assembly 50 to the optical configuration (FIGS. 4 and 6) corresponding to the first zoom position ZP1 to the optical configuration (FIG. 8) corresponding to the second zoom position ZP2. The selection drive mechanism 58 operates under the control of a focusing system 60 of the imaging system 12.

The focusing system 60 may utilize two different methods, namely, laser ranging and focus analysis, or a combination thereof to determine which zoom position ZP1 or ZP2 is most appropriate for imaging a particular target bar code 34. Laser ranging determines a distance between the camera assembly 20 and a target bar code 34 utilizing the laser aiming pattern assembly 45. If the determined distance requires short range imaging (arms' length or less), the focusing system 60 would signal the selection drive mechanism 58 to configure the imaging lens assembly 50 in zoom position one ZP1. If the determined distance requires long range imaging (more than arms' length), the focusing system 60 would signal the selection drive mechanism 58 to configure the imaging lens assembly 50 in zoom position two ZP2.

Focus analysis is based upon determining the image size and quality of a digitized imaged bar code 34" present in one or more captured image frames 74. For example, imaging would be initiated in a given state, for example, initiate imaging in zoom position one ZP1. Assuming a digitized imaged target bar code 34" is found within one or more of the captured image frames 74, the focusing system 60 will analyze the image size and image quality of the digitized imaged bar code 34" to determine if it is suitable for decoding. If so, there is no need to change the imaging lens assembly 50 to the second zoom position ZP2. If, however, it is determined that the image size of the digitized imaged bar code 34" is too small for decoding or the quality of the digitized imaged bar code 34" is unacceptable, the focusing system 60 will direct the selection drive mechanism 58 to change to zoom position two ZP2.

The focusing system 60 may be part of the imaging system circuitry 22 or it may be embodied in separate circuitry/software that is separate from but electrically coupled to the imaging system circuitry 22, the microprocessor 11a and the memory 84. Various suitable focusing systems 60 which analyze image frame quality and locate target bar code images with captured image frames are known to those of skill in the art.

An automatic focusing system suitable for an imaging-based bar code reader that discusses both laser ranging and focusing analysis is disclosed in U.S. Pat. No. 7,303,131, issued Dec. 4, 2007 to Carlson et al. and entitled "Automatic Focusing System for Imaging-Based Bar Code Reader." The '131 patent is assigned to the assignee of the present invention and is incorporated herein in its entirety by reference. Statistical/autodiscrimination techniques useful in identification of bar code images in captured image frames are disclosed in U.S. Pat. No. 6,405,925, issued Jun. 18, 2002 to He et al. and entitled "Autodiscrimination and Line Drawing Techniques for Code Readers." The '925 patent is assigned to the assignee of the present invention and is incorporated herein in its entirety by reference.

In the first zoom position ZP1, the imaging lens assembly 50 defines a first optical axis OA1 and projects or focuses illumination from the field of view FV1 onto the sensor array 28. In the second zoom position ZP2, the imaging lens assembly 50 defines a second optical axis OA2 and projects or focuses illumination from the field of view FV2 onto the sensor array. In a first exemplary embodiment of the imaging lens assembly 50 (shown in FIGS. 6-9), the first and second optical axis OA1, OA2 are congruent. Unlike most photographic zoom lens systems which require multiple drive motors for changing a focal length of the system and for focusing the zoom lens system, advantageously, the imaging lens assembly 50 of the present invention is a simplified system requiring only a single drive motor M to effect the two zoom positions ZP1, ZP2. Another advantage of the zoom lens assembly 50 of the present invention is that a precision stepper motor, often used in photographic zoom lens systems, is not required. Rather a less costly, less precise motor M, such as, for example, a synchronous DC motor having an accuracy in the range of 100s of microns is sufficient to maintain focus and provide acceptable image quality. Also, as compared to conventional photographic camera were the zoom is continuous, in the imaging lens assembly 50 of the present invention, the motor M needs only move the lens element 56 between two positions, in line and out of line with the optical axis OA1.

Illumination Assembly and Aiming Pattern Assembly

As noted above, the illumination assembly 40 and aiming pattern assembly 45 are configured to generate two illumination patterns IP1, IP2 and two aiming patterns AP1, AP2. The illumination assembly 40 and aiming pattern assembly 45 operate under the control of the focusing system 60 which will select illumination pattern IP1 when the imaging system 12 is activated for imaging and the imaging lens assembly 50 is in the first zoom position ZP1 for short range imaging. Similarly, the focusing system 60 will select illumination pattern IP1 when the imaging system 12 is actuated and the imaging lens assembly is in the second zoom position ZP2 for long range imaging.

First Embodiment of Illumination Assembly 40

In a first exemplary embodiment, the illumination assembly 40 includes two sets or banks of LEDs. Under the control of the focusing system 60, the first illumination pattern IP1 is generated by the first bank of LEDs 41 (shown schematically in FIGS. 2 and 4) when imaging is occurring in the first zoom position ZP1 and the second illumination pattern IP2 is generated by the second bank of LEDs 42 when imaging is occurring in the second zoom position ZP2. The LED banks 41, 42 may be surface mount LEDs or other illumination sources such as a cold cathode lamp. The LEDs typically will emit red illumination in the visible spectrum (approximately 620-690 nanometers), it should be understood that depending on the specifics of the reader and the environmental conditions under which the reader will be used, a more sophisticated illumination assembly may be utilized differing illumination wavelengths and/or focusing optics.

The first illumination pattern IP1 is a relatively wide angle illumination pattern which is substantially congruent with the first field of view FV1 over at least a portion of the short range (20" or less—shown as working range WR1 in FIG. 3). A diagonal angle IPD1 of the first illumination pattern IP1 (shown schematically in FIG. 4) is substantially equal to the diagonal angle FVD1 of the first field of view FV1.

The second illumination pattern IP2 is a relatively narrow angle illumination pattern which is substantially congruent with the second field of view FV2 over at least a portion of the long range (more than 20"—shown as working range WR2 in FIG. 3). A diagonal angle IPD2 of the second illumination pattern IP2 (shown schematically in FIG. 4) is substantially equal to the diagonal angle FVD2 of the second field of view FV2. In general, there will be less LEDs in the second LED bank 42 than in the first LED bank 41 and the second bank of LEDs 42 may be placed closer to the image collection aperture 53 of the imaging lens assembly 50. While there may be less LEDs in the second bank 42 of LEDs, each of the LEDs of the second bank 42 must be more powerful than in the first bank 41 of LEDs because the LEDs of the second bank 42 need to provide sufficient illumination intensity at relatively long distances from the illumination assembly 40, as compared to the relatively short distances for the first bank of LEDs 41. Consequently, the second bank 42 of LEDs must be more powerful and have greater intensity. The LEDs in the first bank 41 may operated at a lower power than the LEDs in the second bank 42, while the LEDs of the second bank 42 may have a shorter cycle time or exposure time to minimize the effect of operator hand jitter when holding the reader 10. Because of the longer distances involved when imaging with the second bank 42 of LEDs, the effect on image quality of any hand jittering is more pronounced than with shorter range imaging. The illumination patterns IP1, IP2 may be continuous or intermittent in nature.

Second Embodiment of Illumination Assembly 140

Figure 17:
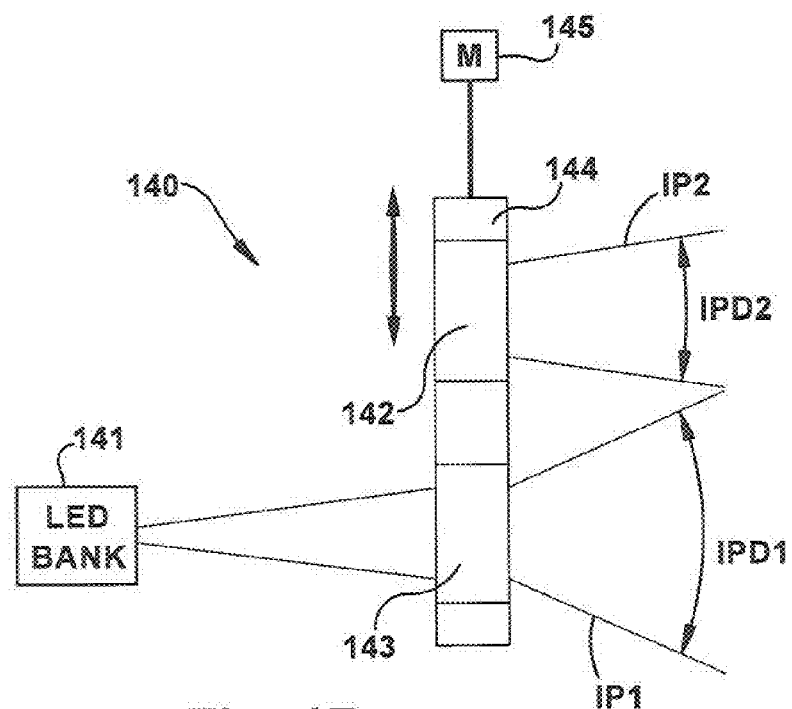
FIG. 17 is a schematic side elevation view of a second embodiment of an illumination assembly of the present invention selectively actuatable in conjunction with the two position optical zoom imaging lens assembly of the present invention to project a first illumination pattern when imaging lens assembly is configured in a first zoom position for imaging a target bar code at a near distance from the imaging lens assembly and to project a second illumination pattern when the imaging lens assembly is configured in a second zoom position for imaging a target bar code at a far distance from the imaging lens assembly, the first illumination pattern substantially corresponding to a first field of view of the imaging lens assembly in the first zoom position and the second illumination pattern substantially corresponding to a second field of view of the imaging lens assembly in the second zoom position.

In a second exemplary embodiment of the illumination assembly of the present invention, instead of using two LED illumination banks 41, 42, the illumination assembly may be configured with a single bank of LEDs and utilize two sets of diffusers. This embodiment is shown schematically in FIG. 17. Under the control of the focusing system 60, the first illumination pattern IP1 is generated when imaging is occurring in the first zoom position ZP1 and the second illumination pattern IP2 is generated when imaging is occurring in the second zoom position ZP2.

The illumination assembly 140 includes a single bank of LEDs 141 and two sets of diffusers 142, 143. The diffusers 142, 143 are supported on a holder 144. The holder 144 is coupled to a motor 145 which operates under the control of the focusing system 60.

The first diffuser 142 provides a diffused illumination pattern IP1 with a wide projection angle that substantially corresponds to the first field of view FV1 over at least a portion of the short range. The second diffuser 143 provides a diffused illumination pattern IP2 that substantially corresponds to the second field of view FV2 over at least a portion of the long range. A diagonal angle IPD1 of the first illumination pattern IP1 (shown schematically in FIG. 17) is substantially equal to the diagonal angle FVD1 of the first field of view FV2. A diagonal angle IPD2 of the second illumination pattern IP2 (shown schematically in FIG. 17) is substantially equal to the diagonal angle FVD2 of the second field of view FV2.

Third Embodiment of Illumination Assembly 240

Figure 18:
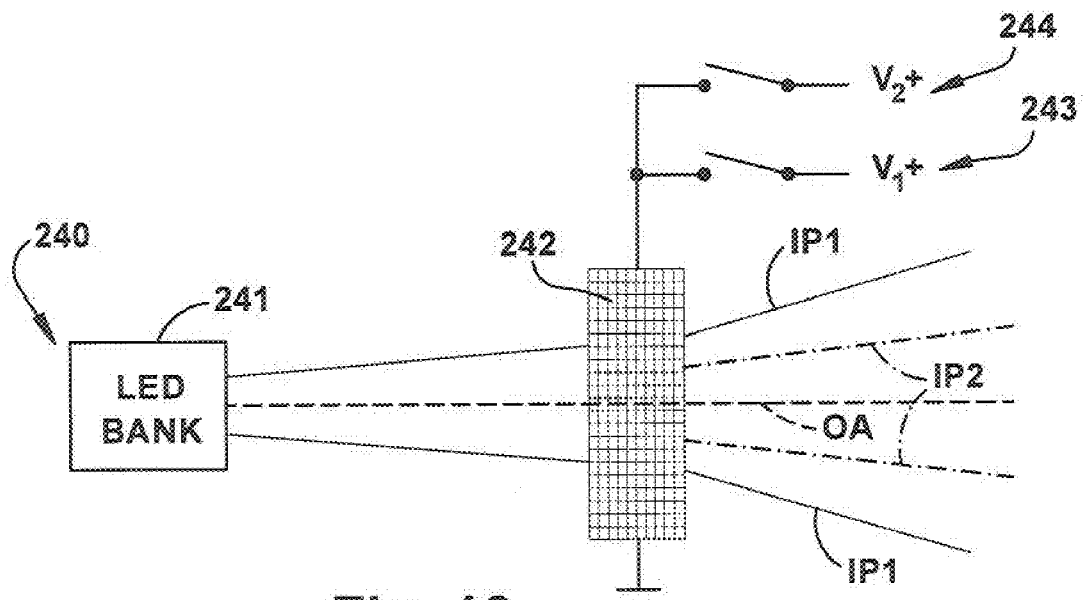
FIG. 18 is a schematic side elevation view of a third embodiment of an illumination assembly of the present invention selectively actuatable in conjunction with the two position optical zoom imaging lens assembly of the present invention to project a first illumination pattern when imaging lens assembly is configured in a first zoom position for imaging a target bar code at a near distance from the imaging lens assembly and to project a second illumination pattern when the imaging lens assembly is configured in a second zoom position for imaging a target bar code at a far distance from the imaging lens assembly, the first illumination pattern substantially corresponding to a first field of view of the imaging lens assembly in the first zoom position and the second illumination pattern substantially corresponding to a second field of view of the imaging lens assembly in the second zoom position.

In a third exemplary embodiment of the illumination assembly of the present invention, instead of using two LED illumination banks 41, 42, the illumination assembly may be configured with a single bank of LEDs and a voltage-controlled spatial light modulator (SLM), which in one embodiment may be a 2D grating. This embodiment is shown schematically in FIG. 18. Under the control of the focusing system 60, the first illumination pattern IP1 is generated when imaging is occurring in the first zoom position ZP1 and the second illumination pattern IP2 is generated when imaging is occurring in the second zoom position ZP2.

The illumination assembly 240 includes a single bank of LEDs 241 and a SLM 242. The SLM 242 is selectively coupled to one of two differing magnitude voltage sources 243, 244. Selective application of the voltage sources 243, 244 to the SLM 242 changes the spatial frequency of the SLM 242 altering the projection angle of the illumination LEDs 241 after passing through the SLM 242 to selectively generate the two illumination patterns IP1, IP2. An appropriate SLM may be obtained from Light Blue Optics Ltd, Cambridge, England (www.lightblueoptics.com).

The first voltage source 243 when coupled to the SLM 242 provides the illumination pattern IP1 with a wide projection angle that substantially corresponds to the first field of view FV1 over at least a portion of the short range. The second voltage source 244 when coupled to the SLM 242 provides the illumination pattern IP2 that substantially corresponds to the second field of view FV2 over at least a portion of the long range. A diagonal angle IPD1 of the first illumination pattern IP1 (shown schematically in FIG. 18) is substantially equal to the diagonal angle FVD1 of the first field of view FV1. A diagonal angle IPD2 of the second illumination pattern IP2 (shown schematically in FIG. 18) is substantially equal to the diagonal angle FVD2 of the second field of view FV2.

Fourth Embodiment of Illumination Assembly 240

Figure 19:
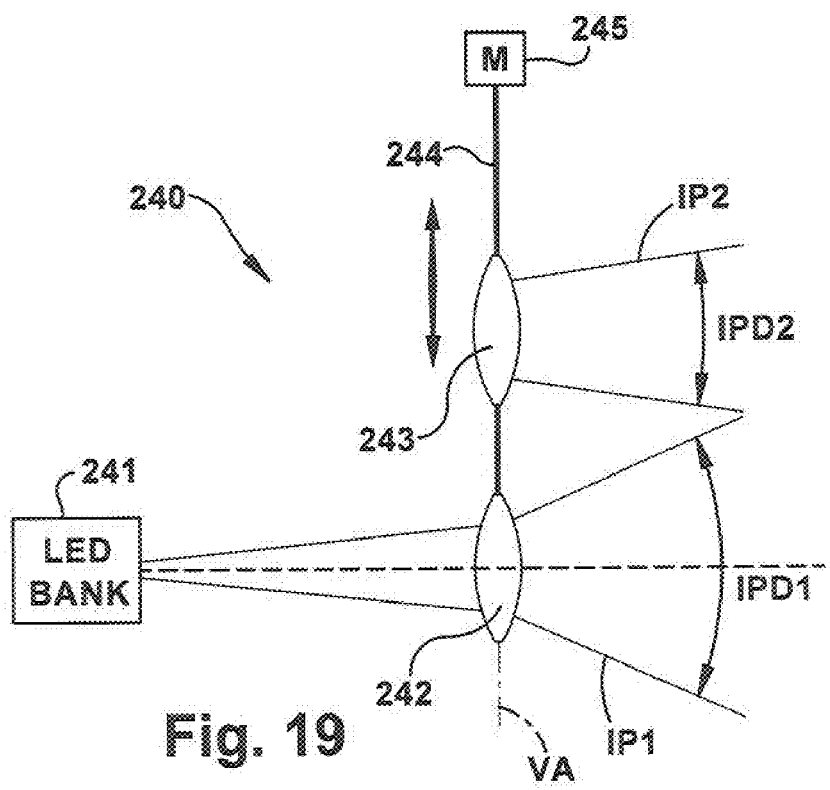
FIG. 19 is a schematic side elevation view of a fourth embodiment of an illumination assembly of the present invention selectively actuatable in conjunction with the two position optical zoom imaging lens assembly of the present invention to project a first illumination pattern when imaging lens assembly is configured in a first zoom position for imaging a target bar code at a near distance from the imaging lens assembly and to project a second illumination pattern when the imaging lens assembly is configured in a second zoom position for imaging a target bar code at a far distance from the imaging lens assembly, the first illumination pattern substantially corresponding to a first field of view of the imaging lens assembly in the first zoom position and the second illumination pattern substantially corresponding to a second field of view of the imaging lens assembly in the second zoom position.

In a fourth exemplary embodiment of the illumination assembly of the present invention, instead of using two LED illumination banks 41, 42, the illumination assembly may be configured with a single bank 241 of LEDs and two lenses 242, 243 mounted on a holder 244 coupled to a motor 245. This embodiment is shown schematically in FIG. 19. Under the control of the focusing system 60, the motor 245 moves the holder 244 along an axis VA that is orthogonal to a general direction of illumination emitted from the LED bank 241.

When imaging is occurring in the first zoom position ZP1, a first wide angle illumination pattern IP1 is generated. Illumination emitted by the LED bank 241 is focused by a first focusing lens 242 is focused into the illumination pattern IP1. When imaging is occurring in the second zoom position ZP2, a second narrow angle illumination pattern IP2 is generated. Illumination emitted by the LED bank 241 is focused by a second focusing lens 243 is focused into the illumination pattern IP2.

A diagonal angle IPD1 (shown schematically in FIG. 19) of the first illumination pattern IP1 is substantially equal to the diagonal angle FVD1 of the first field of view FV1. A diagonal angle IPD2 (shown schematically in FIG. 19) of the second illumination pattern IP2 is substantially equal to the diagonal angle FVD2 of the second field of view FV2.

Fifth Embodiment of Illumination Assembly 340

Figure 20:
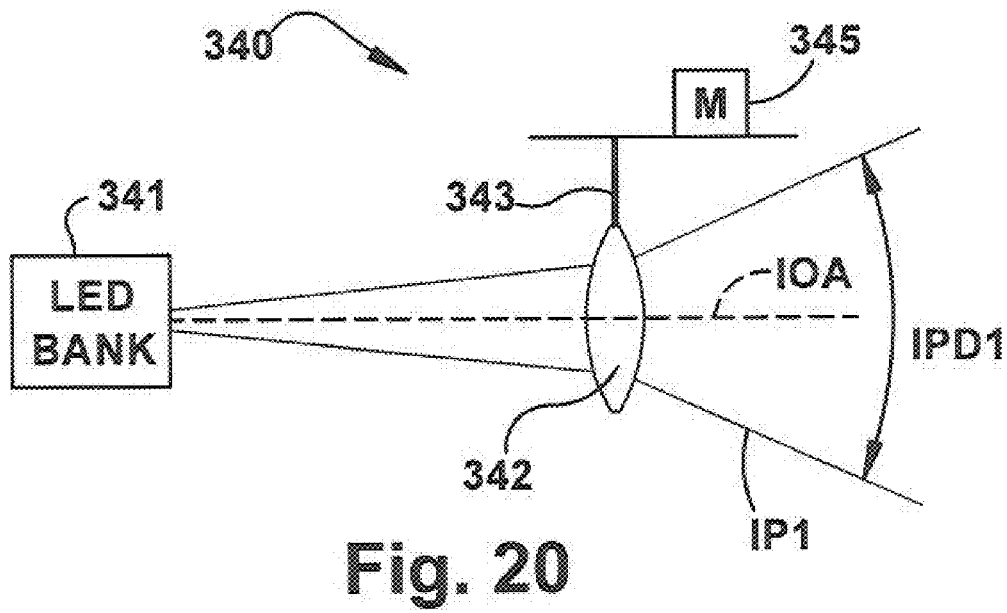
FIGS. 20 and 21 are schematic side elevation views of a fifth embodiment of an illumination assembly of the present invention selectively actuatable in conjunction with the two position optical zoom imaging lens assembly of the present invention to project a first illumination pattern when imaging lens assembly is configured in a first zoom position for imaging a target bar code at a near distance from the imaging lens assembly and to project a second illumination pattern when the imaging lens assembly is configured in a second zoom position for imaging a target bar code at a far distance from the imaging lens assembly, the first illumination pattern substantially corresponding to a first field of view of the imaging lens assembly in the first zoom position and the second illumination pattern substantially corresponding to a second field of view of the imaging lens assembly in the second zoom position
Figure 21:
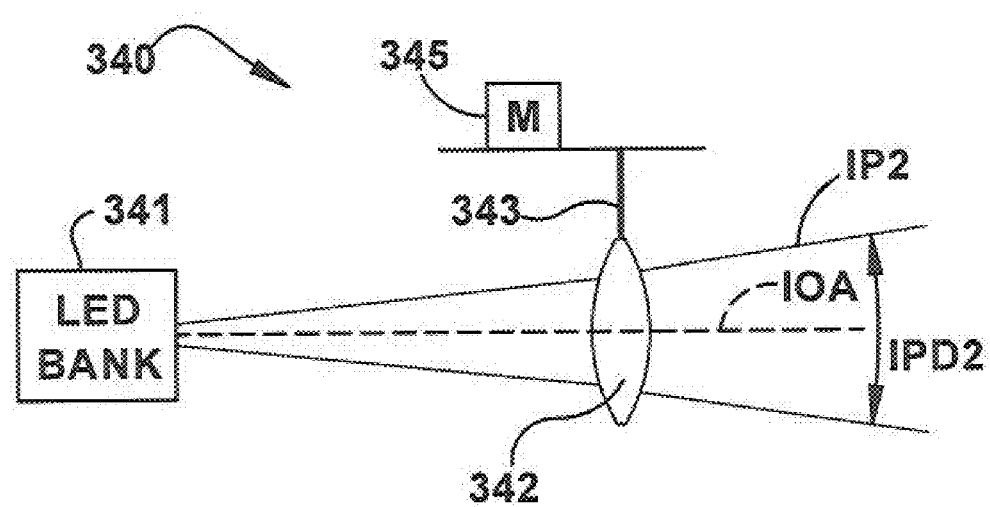

In a fifth exemplary embodiment of the illumination assembly of the present invention, instead of using two LED illumination banks 41, 42, the illumination assembly may be configured with a single bank 341 of LEDs and a lens 342 mounted on a holder 343 coupled to a motor 345. This embodiment is shown schematically in FIGS. 20 and 21. Under the control of the focusing system 60, the motor 345 moves the holder 244 axially, that is, along an axis that is parallel to the imaging optical axis IOA and in a general direction of illumination emitted from the LED bank 341.

To generate the second illumination pattern IP2, the lens 342 is moved, under the control of the focusing system 60, along its path of travel to an in-focus position with respect to the LED bank 341 such that the narrow angle illumination of the second illumination pattern IP2 is generated. To generate the first illumination pattern IP1, the lens is moved, under the control of the focusing system 60, along its path of travel to a slightly out of focus position to slightly diverge the LED illumination thereby generating the wide angle first illumination pattern IP1.

When imaging is occurring in the first zoom position ZP1, the first wide angle illumination pattern IP1 is generated. When imaging is occurring in the second zoom position ZP2, the second narrow angle illumination pattern IP2 is generated. A diagonal angle IPD1 (shown schematically in FIG. 20) of the first illumination pattern IP1 is substantially equal to the diagonal angle FVD1 of the first field of view FV1. A diagonal angle IPD2 (shown schematically in FIG. 21) of the second illumination pattern 1P2 is substantially equal to the diagonal angle FVD2 of the second field of view FV2.

First Embodiment of Aiming Pattern Assembly 45

A first exemplary embodiment of the aiming pattern assembly 45 is schematically shown in FIG. 4. The aiming pattern assembly 45 is provided to aid the operator in properly aiming the reader 10 at a target bar code 34 when the reader is used in the hand-held mode of operation.

The aiming pattern assembly 45 includes a laser diode 46 which is focused into a laser beam 46a by a focusing lens 47. The aiming pattern assembly 45 further includes a movable aiming pattern generator 48 and a motor 49. The aiming pattern generator 48 is coupled to the motor 49 which, operating under the control of the focusing system 60, selectively moves the aiming pattern generator 48 into and out of alignment with the laser beam 46*a*.

When the focusing system 60 determines, based on a target distance to a bar code 34, imaging will occur in the first zoom position ZP1 (short range imaging), the aiming pattern generator 48 is moved by the motor 49 into alignment with the laser beam 46*a* such that the beam strikes the aiming pattern generator 48. This results in the cross hair illumination pattern AP1 being generated (shown in FIG. 4). When the focusing system 60 determines, based on a target distance to a bar code 34, imaging will occur in the second zoom position ZP2 (long range imaging), the aiming pattern generator 48 is moved by the motor 49 out of alignment with the laser beam 46*a* such that the aiming pattern generator 48 is not struck by the beam. This results in a simple dot illumination pattern AP2 being generated (also shown in FIG. 4).

The aiming pattern assembly 45 is configured such that the cross hairs pattern of the first aiming pattern AP1 is substantially congruent with a center point CP1 (FIG. 7) of the first field of view FV1 along at least some portion of the short range (shown schematically as a region adjacent a point labeled CSR in FIG. 4 which is within working range WR1 in FIG. 3). Similarly, the aiming pattern assembly 45 is configured such that the dot pattern of the second aiming pattern AP2 is substantially congruent with a center point CP2 of the second field of view FV2 along at least some portion of the long range (shown schematically as a region adjacent a point labeled as CLR in FIG. 4 which is within working range WR2 in FIG. 3).

To avoid having either the aiming pattern AP1, AP2 appear in captured image frames 74 that are to be analyzed for the presence of an imaged target bar code 34", the aiming pattern 46 is disabled when the imaging system 12 images the target bar code 34. Alternately, if it is desired to have the aiming pattern on during a portion or portions of an imaging session to facilitate aiming the reader during the pendency of an imaging session, those captured image frames 74 that are generated during the activation of either of the two aiming pattern AP1, AP2 are not analyzed and are discarded.

Second Exemplary Embodiment of Imaging Lens Assembly 150

Figure 10:
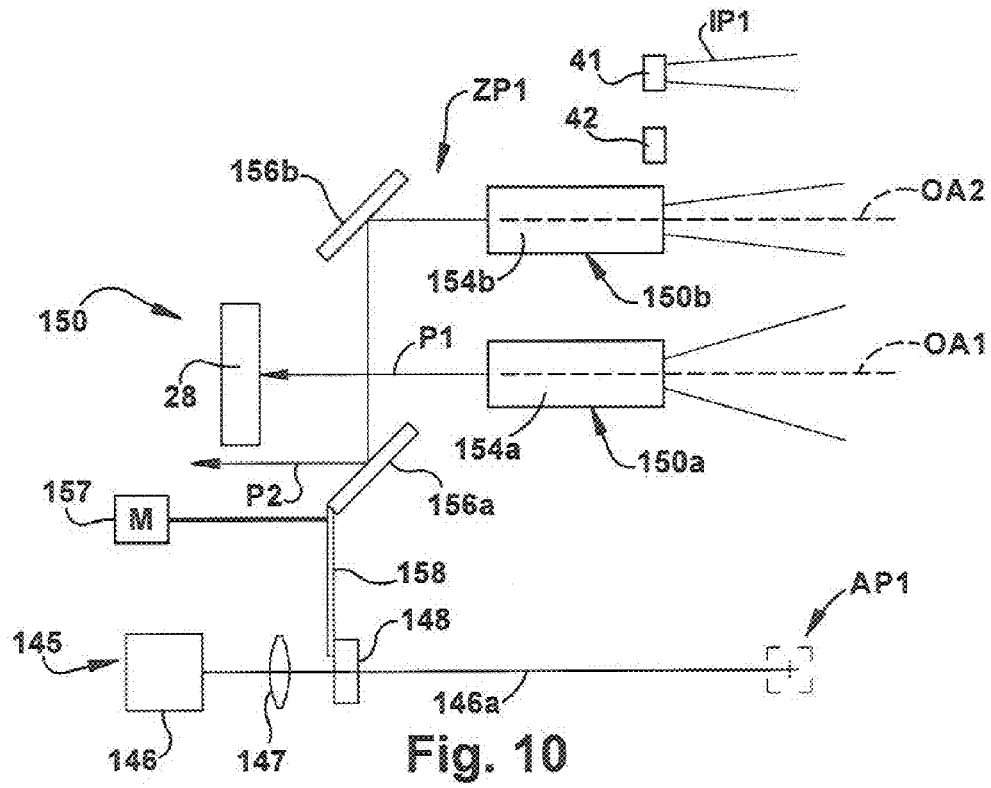
FIG. 10 is a schematic side elevation view of a second exemplary embodiment of a two position optical zoom imaging lens assembly of the present invention in a first zoom position for imaging a target bar code at a near distance from the imaging lens assembly, a second exemplary embodiment of an aiming pattern assembly projecting a first aiming pattern for aiming the reader at a target bar code at a near distance from the imaging lens assembly, and an illumination pattern assembly projecting a first illumination pattern substantially corresponding to a first field of view of the imaging lens assembly in the first zoom position.
Figure 11:
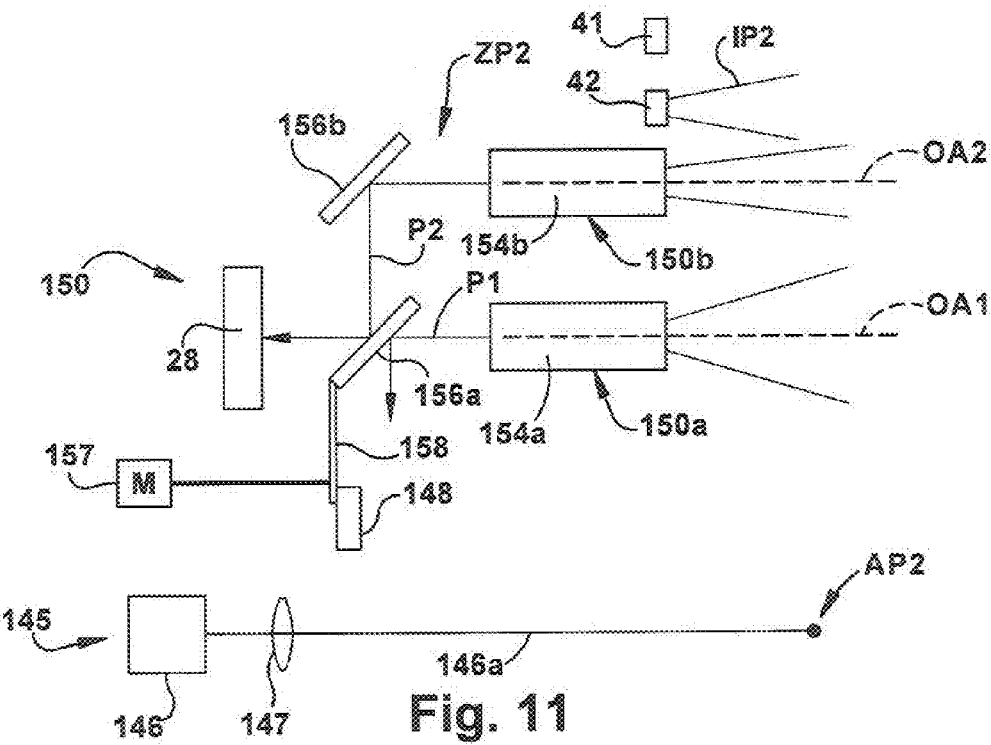
FIG. 11 is a schematic side elevation view of a second exemplary embodiment of the two position optical zoom imaging lens assembly of FIG. 10 in a second zoom position for imaging a target bar code at a far distance from the imaging lens assembly, an aiming pattern assembly projecting a second aiming pattern for aiming the reader at a target bar code at a far distance from the imaging lens assembly, and an illumination pattern assembly projecting a second illumination pattern substantially corresponding to a second field of view of the imaging lens assembly in the second zoom position.

A second exemplary embodiment of the imaging lens assembly of the present invention is shown generally at 150 in FIGS. 10 and 11. In this embodiment, there are two sets of imaging lenses 150*a*, 150*b*, each having a plurality of fixed lenses (not shown) and defining a respective optical axis OA1, OA2. The optical axes OA1, OA2 are substantially parallel. The first set of imaging lenses 150*a* is aligned with the sensor array 28 and is adapted for short range imaging. The first set of imaging lenses 150*a* includes a plurality of fixed lenses having the optical characteristics of the plurality of fixed lenses 52, the aperture stop 53 and the movable lens 56 of the first embodiment.

The second set of imaging lenses 150*b* is offset from the sensor array 28 and is adapted for long range imaging. The second set of imaging lenses 150*b* includes the plurality of fixed lenses 52 and the aperture stop 53 of the first embodiment. In other words, the first optical zoom position ZP1 corresponds to having the first set of imaging lenses 150*a* focusing light from a wide angular first field of view FV1 onto the sensor array 28 while the second optical zoom position ZP2 corresponds to having the second set of imaging lenses 150*b* focusing light from a narrow angular second field of view FV2 on the sensor array 28.

In order to effectuate selectively switching between the first and second optical zoom position ZP1, ZP2, the imaging lens assembly 150 includes a pair of fold minors 156*a*, 156*b*. The fold mirrors 156*a*, 156*b* are aligned to intersect the respective optical axis OA1, OA2 of the first and second sets of imaging lens 150*a*, 150*b*. The fold minor 156*b* is a fixed position minor and is oriented at an angle of approximately 45° with respect to the optical axis OA2. As required and if necessary, optical power can be introduced in the fixed position fold minor 150*b* to increase the focal length without increasing the physical distance from the second set of imaging lenses 150*b* to the sensor array 28. If optical power is introduced into the fixed position fold minor 150*b*, the minor should have different optical powers in the two cross sections to compensate for the tilt, i.e., the fold minor may have a toric surface.

The fold minor 156*a* is movable by a motor 157 along an axis MI which is orthogonal the optical axes OA1, OA2. The fold mirror 156*a* is oriented at an angle of approximately 45° with respect to the optical axis OA1 (FIG. 11). Extending from the fold minor 156*a* is a holder 158 which support an aiming pattern generator 148.

In the first optical zoom position ZP1, shown schematically in FIG. 10, the fold minor 156*a* is moved by the motor 157, under the control of the focusing system 60, to the position shown in FIG. 10 out of alignment with the optical axis OA1. Light from the first field of view FV1 is focused and projected by the first set of lenses 150*a* onto the sensor array 28, schematically shown as light path P1 in FIG. 10. Light from the second field of view FV2 which is focused and projected by the second set of lenses 150*b* follows the light path P2 and does not intersect the sensor array 28. With respect to the illumination assembly 40, the first bank of LEDs is actuated to generate the illumination pattern IP1 to illuminate the first field of view FV1.

In the second optical zoom position ZP2, shown schematically in FIG. 11, the fold minor 156*a* is moved by the motor 157, under the control of the focusing system 60, to the position shown in FIG. 11 out of alignment with the optical axis OA1. Light from the second field of view FV2 is focused and projected by the second set of lenses 150*b* onto the sensor array 28, as shown schematically by light path P2. Light from the first field of view FV1 which is focused and projected by the first set of lenses 150*a* follows the light path P1 and does not intersect the sensor array 28. With respect to the illumination assembly 40, the second bank of LEDs is actuated to generate the illumination pattern IP2 to illuminate the second field of view FV2.

Instead of fold mirrors 156*a*, 156*b*, cholesteric liquid crystals (CLC) elements may be used. Upon application of appropriate voltage, a CLC element will change from a transparent state to a reflective state. A pair of CLC elements would be positioned similarly to the position of the fold mirrors 156*a*, 156*b* in FIG. 11. To select the first zoom position ZP1, both CLC elements would be switched to the transparent state. To select the second zoom position ZP2, both CLC elements would be switched to the reflective state. To minimize ghosting and secondary reflections, the CLC elements should be antireflection coated.

Alternately, instead of using fold mirrors or CLC elements, element 156*a* may be a regular reflective mirror and element 156*b* may be an antireflection coated CLC element. The CLC element 156*b* is switched to a transparent state when imaging in the first zoom position ZP1 and is switched to a reflective state when imaging in the second zoom position ZP2.

In one exemplary embodiment, the lenses of the first and second set of lenses 150*a*, 150*b* are achromatic doublets which advantageously compensate for chromatic aberrations at desired ranges of wavelengths in the visible spectrum. For example, if the illumination system LEDs 41, 42 emit illumination in the visible red wavelength range, approximately 620-690 nanometers, then the achromatic doublets would be fabricated to compensate for chromatic aberrations in the red range of the visible spectrum. If not compensated for, chromatic aberration in the red visible wavelength range may otherwise compromise image quality. As is known to those of skill in the art, the achromatic doublets are fabricated of a positive high-index crown glass cemented to a negative high-index flint glass.

Second Embodiment of Aiming Pattern Assembly 145

A second embodiment of the aiming pattern assembly of the present invention is shown generally at 145 in FIGS. 10 and 11. The aiming pattern assembly 145 includes a laser diode 146, a focusing lens 146 which shapes a laser beam 146a. The aiming patter assembly 145 also includes the aiming pattern generator 148 which is affixed to the holder 158. The aiming pattern generator 148 moves with the first fold minor 156a along the axis MI under the control of the motor 157.

In the first optical zoom position ZP1, as shown in FIG. 10, the aiming pattern generator 148 intersects the laser beam 146a and generates the crosshair short range first aiming pattern AP1. The center crosshairs of AP1 are substantially congruent with a center point CP1 of the first field of view FV1 over at least a portion of the short range, i.e., working range WR1. In the second optical zoom position ZP2, as shown in FIG. 11, the aiming pattern generator 148 does not intersects the laser beam 146a. Thus, the second long range aiming pattern AP2 is generated by the laser diode 146 and the focusing lens 147.

Third Exemplary Embodiment of Imaging Lens Assembly 250

Figure 12:
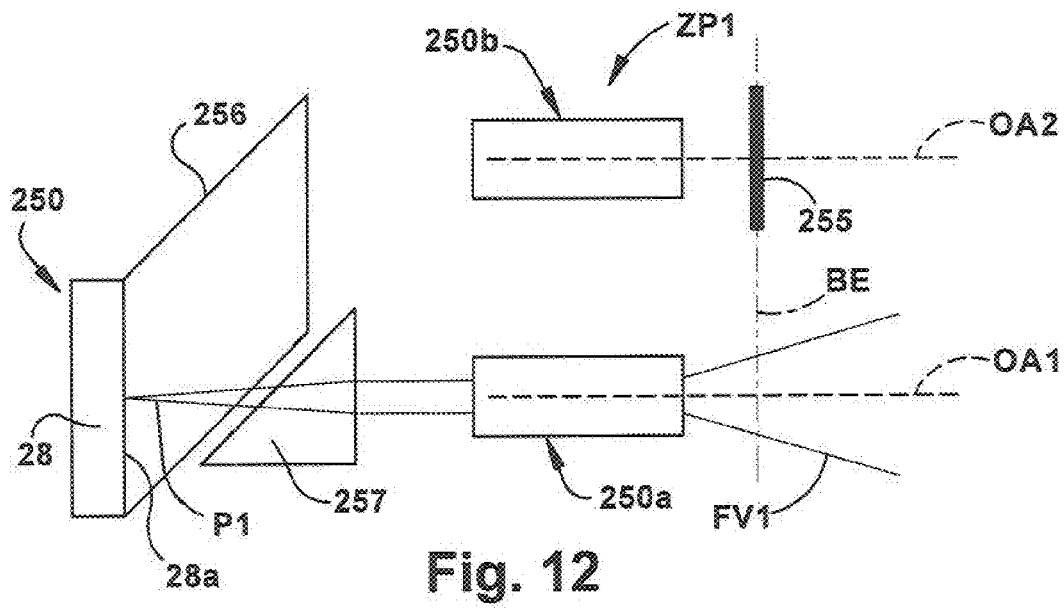
FIG. 12 in a schematic side elevation view of a third exemplary embodiment of a two position optical zoom imaging lens assembly of the present invention in a first zoom position for imaging a target bar code at a near distance from the imaging lens assembly.
Figure 13:
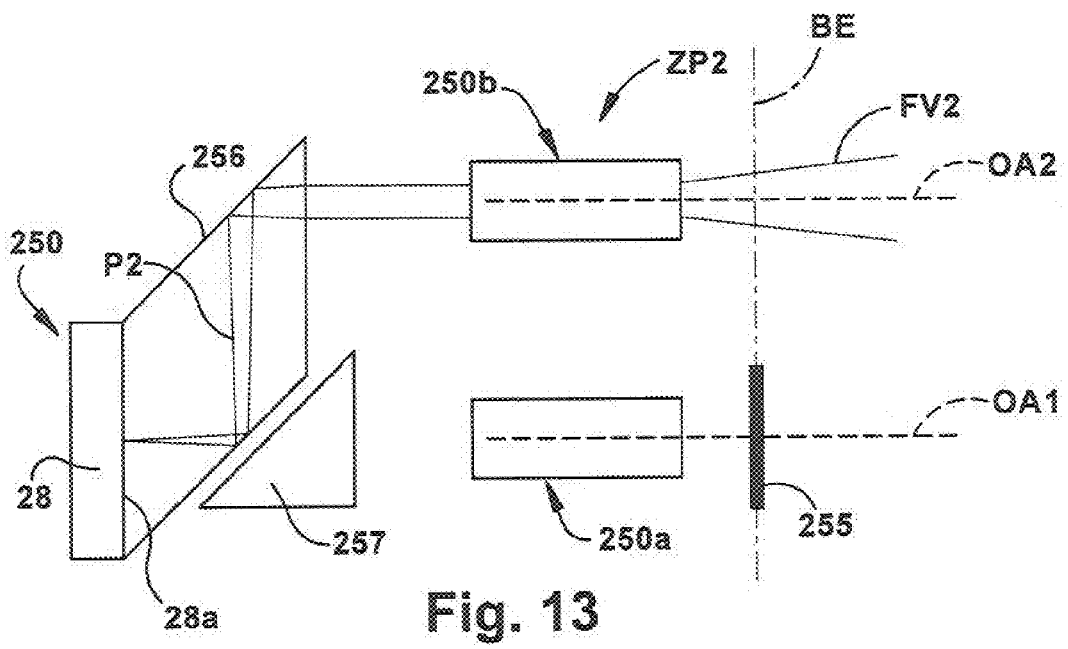
FIG. 13 is a schematic side elevation view of a third exemplary embodiment of the two position optical zoom imaging lens assembly of FIG. 12 in a second zoom position for imaging a target bar code at a far distance from the imaging lens assembly.

A third exemplary embodiment of the imaging lens assembly of the present invention is shown generally at 250 in FIGS. 12 and 13. In this embodiment, there are two sets of imaging lenses 250a, 250b, each having a plurality of fixed lenses (not shown) and defining a respective optical axis OA1, OA2. The optical axes OA1, OA2 are substantially parallel. The first set of imaging lenses 250a is aligned with the sensor array 28 and is adapted for short range imaging. The first set of imaging lenses 250a includes a plurality of fixed lenses having the optical characteristics of the plurality of fixed lenses 52, the aperture stop 53 and the movable lens 56 of the first embodiment.

The second set of imaging lenses 250b is offset from the sensor array 28 and is adapted for long range imaging. The second set of imaging lenses 250b includes the plurality of fixed lenses 52 and the aperture stop 53 of the first embodiment. In other words, the first optical zoom position ZP1 corresponds to having the first set of imaging lenses 250a focusing light from a wide angular first field of view FV1 onto the sensor array 28 while the second optical zoom position ZP2 corresponds to having the second set of imaging lenses 250b focusing light from a narrow angular second field of view FV2 on the sensor array 28.

In order to effectuate selectively switching between the first and second optical zoom positions ZP1, ZP2, the imaging lens assembly 150 includes a light blocking element 255 acutable by a motor (not shown) to move along axis BE to selectively block light from entering either of the first or second set of imaging lenses 250a, 250b. Instead of the pair of fold minors 156a, 156b, a fixed position prism 256 is provided in a periscope configuration which doubles as an optical window sealing and protecting the sensor array light receiving surface 28a. An additional prism 257 is provided so that a central ray of light from the first set of lenses 250a impinges on the light receiving surface 28a of the sensor array 28. The first and second set of lenses 250a, 250b typically consist of three to four optical elements to correct for optical aberrations. Any aberrations introduced by first and second prisms 256, 257 may be accounted for in the design of the first and second set of lenses 250a, 250b.

In the first optical zoom position ZP1, as shown schematically in FIG. 12, the light blocking element 255, under the control of the focusing system 60, is moved along the axis BE to overlie and prevent light from entering the second set of lenses 250b. Light from the first field of view FV1 is focused and projected by the first set of lenses 250a and the second prism 257 onto the sensor array 28, schematically shown as light path P1 in FIG. 12. Light from the second field of view FV2 is blocked by the light blocking element 255.

In the second optical zoom position ZP2, as shown schematically in FIG. 13, the light blocking element 255, under the control of the focusing system 60, is moved along the axis BE to overlie and prevent light from entering the first set of lenses 250a. Light from the second field of view FV2 is focused and projected by the second set of lenses 250b and the first prism 256 onto the sensor array 28, schematically shown as light path P2 in FIG. 13. Light from the first field of view FV1 is blocked by the light blocking element 255.

Fourth Exemplary Embodiment of Imaging Lens Assembly 350

Figure 14:
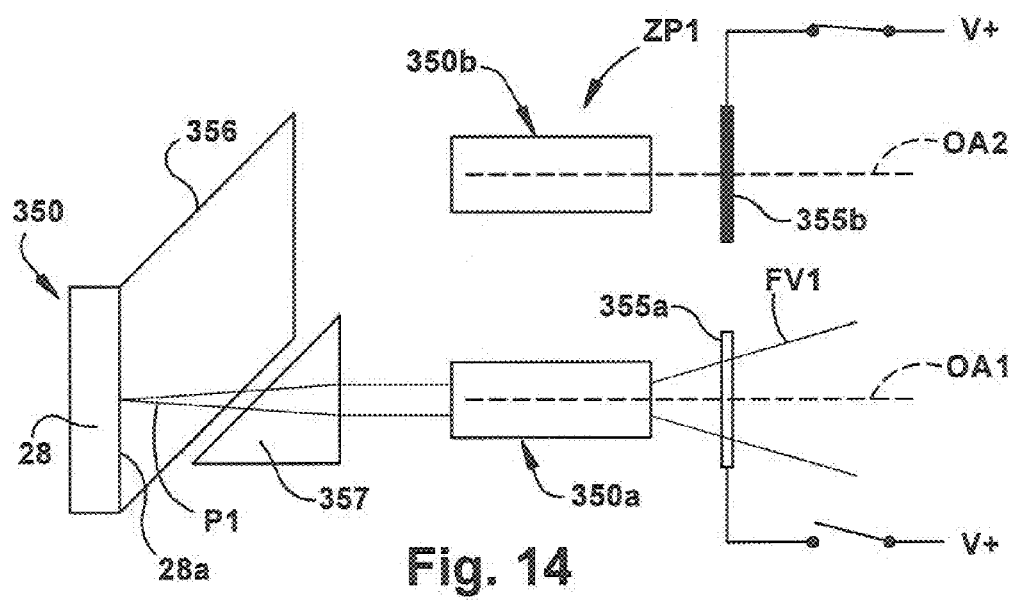
FIG. 14 is a schematic side elevation view of a fourth exemplary embodiment of a two position optical zoom imaging lens assembly of the present invention in a first zoom position for imaging a target bar code at a near distance from the imaging lens assembly.
Figure 15:
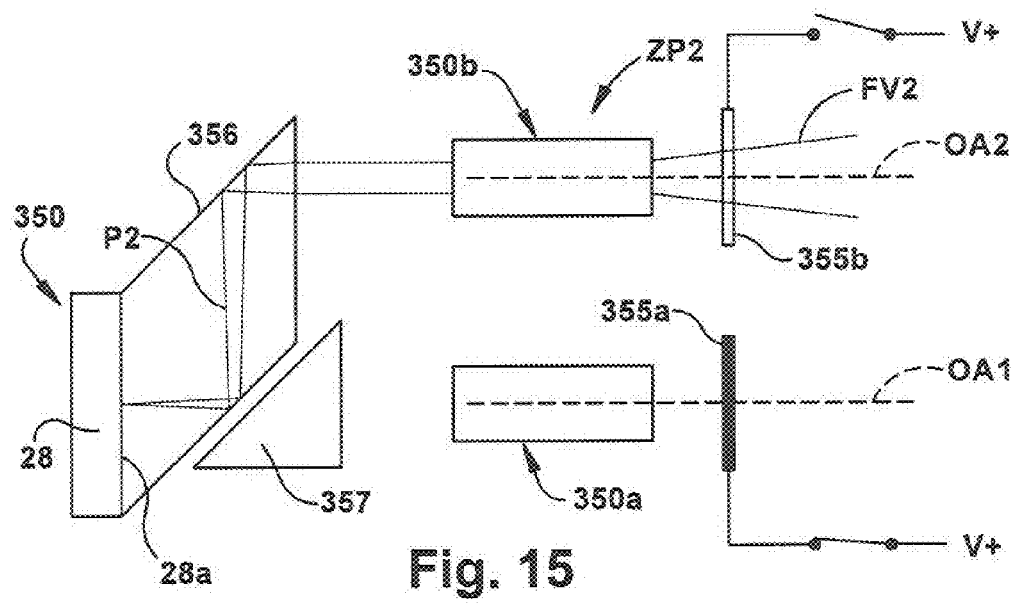
FIG. 15 is a schematic side elevation view of a fourth exemplary embodiment of the two position optical zoom imaging lens assembly of FIG. 14 in a second zoom position for imaging a target bar code at a far distance from the imaging lens assembly.

A fourth exemplary embodiment of the imaging lens assembly of the present invention is shown generally at 350 in FIGS. 14 and 15. In this embodiment, there are two sets of imaging lenses 350a, 350b, each having a plurality of fixed lenses (not shown) and defining a respective optical axis OA1, OA2. The optical axes OA1, OA2 are substantially parallel. The first set of imaging lenses 350a is aligned with the sensor array 28 and is adapted for short range imaging. The first set of imaging lenses 350a includes a plurality of fixed lenses having the optical characteristics of the plurality of fixed lenses 52, the aperture stop 53 and the movable lens 56 of the first embodiment.

The second set of imaging lenses 350b is offset from the sensor array 28 and is adapted for long range imaging. The second set of imaging lenses 350b includes the plurality of fixed lenses 52 and the aperture stop 53 of the first embodiment. In other words, the first optical zoom position ZP1 corresponds to having the first set of imaging lenses 350a focusing light from a wide angular first field of view FV1 onto the sensor array 28 while the second optical zoom position ZP2 corresponds to having the second set of imaging lenses 350b focusing light from a narrow angular second field of view FV2 on the sensor array 28.

As before, in the third embodiment, a fixed position prism 356 is provided in a periscope configuration which doubles as an optical window sealing and protecting the sensor array light receiving surface 28a. An additional prism 357 is provided so that a central ray of light from the first set of lenses 350a impinges on the light receiving surface 28a of the sensor array 28.

Instead of a mechanical light blocking element 255 that is moved into a position overlying a selected one of the two sets of imaging lenses, in the present embodiment a pair of CLC elements 355a, 355b are provided. The first CLC element 355a is positioned overlying the first set of imaging lenses 350a, while the second CLC element 355b is positioned overlying the second set of imaging lenses 350b.

In the first optical zoom position, appropriate voltages are applied to the first and second CLC elements 355a, 355b such that the first CLC element 355a is in a transparent state and the second CLC element 355b is in a reflective state. This prevents light from entering the second set of lenses 350b. Light from the first field of view FV1 is focused and projected by the first set of lenses 350a and the second prism 357 onto the sensor array 28, schematically shown as light path P1 in FIG. 14. Light from the second field of view FV2 is blocked by the light blocking element 355b.

In the second optical zoom position, appropriate voltages are applied to the first and second CLC elements 355a, 355b such that the first CLC element 355a is in a reflective state and the second CLC element 355b is in a transparent state. This prevents light from entering the first set of lenses 350a. Light from the second field of view FV2 is focused and projected by the second set of lenses 350a and the first prism 356 onto the sensor array 28, schematically shown as light path P2 in FIG. 15. Light from the first field of view FV1 is blocked by the light blocking element 355a.

Fifth Exemplary Embodiment of Imaging Lens Assembly 450

Figure 16:
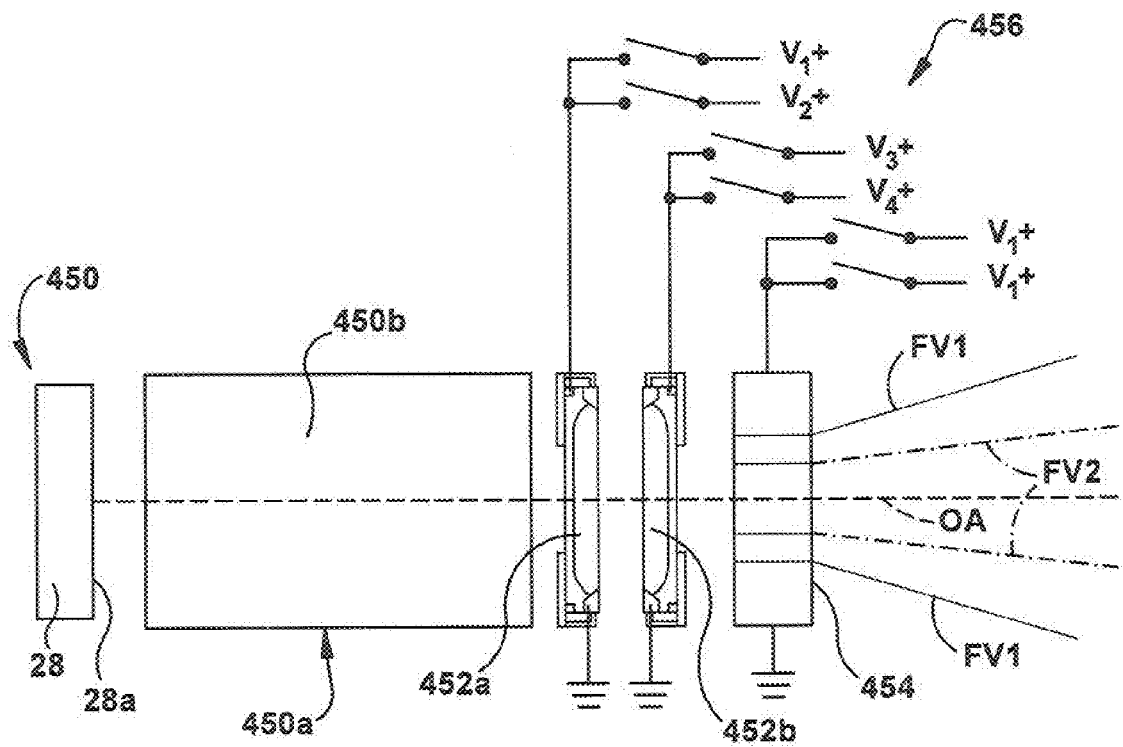
FIG. 16 is a schematic side elevation view of a fifth exemplary embodiment of a two position optical zoom imaging lens assembly of the present invention selectively actuatable between in a first zoom position for imaging a target bar code at a near distance from the imaging lens assembly and a second zoom position for imaging a target bar code at a far distance from the imaging lens assembly.

A fifth exemplary embodiment of the imaging lens assembly of the present invention is shown generally at 450 in FIG. 16. In this embodiment, instead of moving optics or the use of blocking elements, the imaging lens assembly includes a set of fixed lenses 450a supported in a lens holder 450b. Additionally, the imaging lens assembly 450 includes fixed position adaptive optics in the form of a pair of liquid lenses 452a, 452b and an external iris 454. The liquid lenses 452a, 452b, such as those available from Varioptic SA of Lyon, France (www.varioptic.com), typically have 20 diopters of optical power, from −5 to +15 m−1 (−200 mm to +67 mm focal length). If only one liquid lens was used, it may be too weak to achieve a 4:1 or more zoom as is desired. Thus, in the present embodiment two liquid lenses are provided.

A description of the structure and operation of a liquid lens is provided in U.S. published application publication no. US 2008/0239509 A1, publication date Oct. 2, 2008 (Ser. No. 11/731,835, filed Mar. 30, 2007) to Vinogradov. Publication no. US 2008/0239509 is assigned to the assignee of the present invention and is incorporated herein in its entirety by reference.

The external iris 454 may be a patterned CLC element. Alternately, the external iris may be a simple liquid crystal element whose clear aperture size may be changed by applying a voltage.

In the first optical zoom position ZP1, appropriate voltages are applied to the liquid lenses 452a, 452b and the external iris 454 such that, in combination with the fixed set of imaging lenses 450a, light from a wide angular first field of view FV1 is focused and projected onto the light receiving surface 28a of the sensor array 28. In the second optical zoom position ZP2, appropriate voltages are applied to the liquid lenses 452a, 452b and the external iris 454 such that, in combination with the fixed set of imaging lenses 450a, light from a narrow angular second field of view FV2 is focused and projected onto the light receiving surface 28a of the sensor array 28.

A system of appropriate voltage sources and switches, shown generally as 456 in FIG. 16, must be provided to change states of the liquid lenses 452a, 452b and the external iris 454 to reconfigure between zoom position ZP1 for short range imaging and zoom position ZP2 for long range imagine. The focusing system 60 controls the selection of the zoom position from the first and second zoom positions ZP1, ZP2 and selection and application of the appropriate voltages from the voltage source and switching system 456 to the liquid lenses 452a, 452b and the external iris 454 to configure the imaging lens assembly 450 to the desired zoom position.

While the present invention has been described with a degree of particularity, it is the intent that the present invention includes all modifications and alterations from the disclosed embodiment or embodiments falling with the spirit or scope of the appended claims. What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit or scope of the appended claims.

We claim:

1. An imaging-based bar code reader comprising:
   an imaging system for imaging a target bar code within a field of view of the imaging system and projecting light from the field of view onto a sensor array, the imaging system generating image frames of the field of view of the imaging system; the imaging system including:
   an imaging lens assembly having a plurality of lens;
   a selection drive mechanism to select between a first optical zoom position defining a first focal length and a first field of view for imaging a target bar code at a close range and a second optical zoom position defining a second focal length and a second field of view for imaging a target bar code at a far range, the second focal length being greater than the first focal length and a diagonal angle subtended by the first field of view being greater than a diagonal angle subtended by the second field of view;
   an illumination assembly including an illumination source providing an illumination pattern projected toward a target bar code, the illumination assembly selectively actuatable between a first illumination pattern and a second illumination pattern, the first illumination pattern being generated when imaging using the first optical zoom position to illuminate the first field of view and the second illumination pattern being generated when imaging using the second optical zoom position to illuminate the second field of view;
   an aiming pattern assembly including an illumination source providing an aiming pattern projected toward a target bar code, the aiming pattern assembly selectively actuatable between a first aiming pattern and a second aiming pattern, the first aiming pattern being generated when imaging using the first optical zoom position to facilitate aiming the reader at a center of the first field of view and the second aiming pattern being generated when imaging using the second optical zoom position to facilitate aiming the reader at a center of the second field of view; and
   wherein the imaging lens assembly comprises a first set of lenses having a first optical axis and defining the first focal length and the first field of view, the first optical axis aligned with the sensor array, and a second set of lenses having a second optical axis laterally offset from the first optical axis and the sensor array and defining the second focal length and the second field of view, the selection drive mechanism including a first light blocker selectively actuatable between a first transparent state wherein light focused through the first set of lenses is projected onto the sensor array and a second blocking state wherein light focused through the first set of lenses is blocked from projection onto the sensor array and a second light blocker selectively actuatable between a first transparent state wherein light focused through the second set of lenses is projected onto the sensor array and a second blocking state wherein light focused through the second set of lenses is blocked from projection onto the sensor array and a prism positioned between the first set of lenses, the second set of lenses and the sensor array to project light focused by either of the first set of lenses or the second set of lenses onto the sensor array at a normal angle, the first blocker being in the first transparent state and the second blocker being in the second blocking state defining the first optical zoom position and the first blocker being in the second blocking state and the second blocker being in the first transparent state defining the second optical zoom position.

2. The bar code reader of claim 1 wherein the first blocker is a light blocking cover that is selectively movable between a first position that is laterally offset from the first optical axis and the first set of lenses, the first position corresponding to the first transparent state for the first blocker and a second position that is in alignment with the first optical axis and the first set of lenses, the second position corresponding to the second blocking state of the first blocker and the second blocker is a light blocking cover that is selectively movable between a first position that is laterally offset from the second optical axis and the second set of lenses, the first position corresponding to the first transparent state of the second blocker and a second position that is in alignment with the second optical axis and the second set of lenses, the second position corresponding to the second blocking state of the second blocker.

3. The bar code reader of claim 1 wherein the first blocker is a cholesteric liquid crystal element that is selectively switchable between a transparent state and a reflective state, the transparent state corresponding to the first transparent state for the first blocker and the reflective state corresponding to the second blocking state of the first blocker and the second blocker is a cholesteric liquid crystal element selectively switchable between a transparent state and a reflective state, the transparent state corresponding to the first transparent state of the second blocker and the second reflective state corresponding to the second blocking state of the second blocker.

4. An imaging-based bar code reader comprising:
an imaging system for imaging a target bar code within a field of view of the imaging system and projecting light from the field of view onto a sensor array, the imaging system generating image frames of the field of view of the imaging system; the imaging system including:
an imaging lens assembly having a plurality of lens;
a selection drive mechanism to select between a first optical zoom position defining a first focal length and a first field of view for imaging a target bar code at a close range and a second optical zoom position defining a second focal length and a second field of view for imaging a target bar code at a far range, the second focal length being greater than the first focal length and a diagonal angle subtended by the first field of view being greater than a diagonal angle subtended by the second field of view;
an illumination assembly including an illumination source providing an illumination pattern projected toward a target bar code, the illumination assembly selectively actuatable between a first illumination pattern and a second illumination pattern, the first illumination pattern being generated when imaging using the first optical zoom position to illuminate the first field of view and the second illumination pattern being generated when imaging using the second optical zoom position to illuminate the second field of view;
an aiming pattern assembly including an illumination source providing an aiming pattern projected toward a target bar code, the aiming pattern assembly selectively actuatable between a first aiming pattern and a second aiming pattern, the first aiming pattern being generated when imaging using the first optical zoom position to facilitate aiming the reader at a center of the first field of view and the second aiming pattern being generated when imaging using the second optical zoom position to facilitate aiming the reader at a center of the second field of view; and
wherein the illumination assembly light source includes a bank of LEDs and a voltage-controlled spatial light modulator position adjacent the bank of LEDs and selectively actuatable between a first spatial frequency to focus light emitted by the band of LEDs into the first illumination pattern and a second spatial frequency to focus light emitted by the band of LEDs into the second illumination pattern, the selection drive mechanism operatively coupled to the illumination assembly and selectively actuating the first illumination pattern when the first optical zoom position is selected and selectively actuating the second illumination assembly when the second optical zoom position is selected.

* * * * *

UNITED STATES PATENT AND TRADEMARK OFFICE
CERTIFICATE OF CORRECTION

| | | |
|---|---|---|
| PATENT NO. | : 7,762,466 B2 | Page 1 of 1 |
| APPLICATION NO. | : 12/337748 | |
| DATED | : July 27, 2010 | |
| INVENTOR(S) | : Tan et al. | |

It is certified that error appears in the above-identified patent and that said Letters Patent is hereby corrected as shown below:

Column 3, Line 63, delete "minor" and insert -- mirror --, therefor.

Column 4, Line 5, delete "minor" and insert -- mirror --, therefor.

Column 4, Line 10, delete "minor" and insert -- mirror --, therefor.

Column 4, Line 15, delete "minor" and insert -- mirror --, therefor.

Column 8, Line 57, delete "position" and insert -- position. --, therefor.

Column 20, Line 3, delete "minors" and insert -- mirrors --, therefor.

Column 20, Line 6, delete "fold minor" and insert -- fold mirror --, therefor.

Column 20, Line 7, delete "minor and" and insert -- mirror and --, therefor.

Column 20, Line 10, delete "minor" and insert -- mirror --, therefor.

Column 20, Line 13, delete "minor 150b, the minor" and insert -- mirror 150b, the mirror --, therefor.

Column 20, Line 15, delete "minor" and insert -- mirror --, therefor.

Column 20, Line 17, delete "minor" and insert -- mirror --, therefor.

Column 20, Line 21, delete "minor" and insert -- mirror --, therefor.

Column 20, Line 24, delete "minor" and insert -- mirror --, therefor.

Column 20, Line 37, delete "minor" and insert -- mirror --, therefor.

Column 21, Line 21, delete "minor" and insert -- mirror --, therefor.

Signed and Sealed this
Twenty-ninth Day of May, 2012

David J. Kappos
*Director of the United States Patent and Trademark Office*